US010031928B2

(12) United States Patent
Yang et al.

(10) Patent No.: US 10,031,928 B2
(45) Date of Patent: Jul. 24, 2018

(54) DISPLAY, VISUALIZATION, AND MANAGEMENT OF IMAGES BASED ON CONTENT ANALYTICS

(71) Applicant: BicDroid Inc, Petersburg (CA)

(72) Inventors: En-Hui Yang, Petersburg (CA); Xiang Yu, Kitchener (CA); Jin Meng, Kitchener (CA)

(73) Assignee: BICDROID INC., Petersburg (CA)

( * ) Notice: Subject to any disclaimer, the term of this patent is extended or adjusted under 35 U.S.C. 154(b) by 347 days.

(21) Appl. No.: 14/790,650

(22) Filed: Jul. 2, 2015

(65) Prior Publication Data

US 2016/0004695 A1 Jan. 7, 2016

Related U.S. Application Data

(60) Provisional application No. 62/020,152, filed on Jul. 2, 2014.

(51) Int. Cl.
*G06F 17/30* (2006.01)
*G06F 3/0484* (2013.01)
(Continued)

(52) U.S. Cl.
CPC ........ *G06F 17/3028* (2013.01); *G06F 3/0482* (2013.01); *G06F 3/0483* (2013.01);
(Continued)

(58) Field of Classification Search
CPC ........... G06F 17/3028; G06F 17/30247; G06F 17/30598; G06F 17/30256; G06F 3/0485; G06F 3/0483; G06F 3/04842; G06F 3/0482; G06F 2203/04804

USPC ....... 707/609, 737, 740, 741, 749, 752, 755, 707/758, 764, 783, 821, 825, 829, 830, 707/912, 915, 953; 715/744, 781, 783, 715/788, 790, 798, 815, 855, 861, 864, 715/866
See application file for complete search history.

(56) References Cited

U.S. PATENT DOCUMENTS 7,441,186 B2 * 10/2008 Kasperkiewicz ... G06F 17/3028
707/999.005
7,711,211 B2 * 5/2010 Snowdon ........... H04N 1/00132
358/403
(Continued)

OTHER PUBLICATIONS

International Preliminary Report on Patentability (IPRP) of corresponding application PCT/CA2015/050617 dated Jan. 3, 2017.
(Continued)

*Primary Examiner* — Greta L Robinson
(74) *Attorney, Agent, or Firm* — Bereskin & Parr LLP/S.E.N.C.R.L., s.r.l.

(57) ABSTRACT

The described embodiments relate to method and products for organizing a plurality of images. Specifically, the methods and products can automatically organize a plurality of images into a plurality of groups of images using allocation criteria. The allocation criteria for each image include a similarity distance between that image and at least one other image that measures how similar those images are. Each image can be allocated to at least one similar image group based on the similarity distance. The methods and products can also be used to visualize and display representative images for each of the groups of images.

35 Claims, 19 Drawing Sheets

(51) Int. Cl.
  *G06F 3/0482* (2013.01)
  *G06F 3/0483* (2013.01)
  *G06F 3/0485* (2013.01)

(52) U.S. Cl.
  CPC ........ *G06F 3/0485* (2013.01); *G06F 3/04842* (2013.01); *G06F 17/30247* (2013.01); *G06F 17/30256* (2013.01); *G06F 17/30598* (2013.01); *G06F 2203/04804* (2013.01)

(56) References Cited

U.S. PATENT DOCUMENTS

| | | | | |
|---|---|---|---|---|
| 8,189,880 B2* | 5/2012 | Wen | .............. | G06F 17/30259 382/118 |
| 8,233,708 B2* | 7/2012 | Yamauchi | ......... | G06F 17/30843 382/165 |
| 8,352,465 B1* | 1/2013 | Jing | .............. | G06F 17/30867 707/723 |
| 8,411,968 B2 | 4/2013 | Isomura et al. | | |
| 8,634,657 B2 | 1/2014 | Sakamoto | | |
| 2006/0074771 A1* | 4/2006 | Kim | .............. | G06F 17/30256 705/26.1 |
| 2006/0200475 A1* | 9/2006 | Das | .............. | G06F 17/30256 |
| 2010/0303342 A1* | 12/2010 | Berg | .............. | G06F 17/30247 382/155 |
| 2012/0076427 A1 | 3/2012 | Hibino et al. | | |
| 2013/0136319 A1 | 5/2013 | Vanhoucke et al. | | |
| 2014/0341476 A1* | 11/2014 | Kulick | .............. | G06K 9/6267 382/224 |

OTHER PUBLICATIONS

International Search Report and Written Opinion of corresponding application PCT/CA2015/050617 dated Sep. 3, 2015.

* cited by examiner

DISPLAY, VISUALIZATION, AND MANAGEMENT OF IMAGES BASED ON CONTENT ANALYTICS

RELATED APPLICATIONS

This application claims priority from the U.S. patent application No. 62/020,152, filed Jul. 2, 2014 entitled "DISPLAY, VISUALIZATION, AND MANAGEMENT OF PHOTOS BASED ON CONTENT ANALYTICS", the disclosure of which is incorporated herein, in its entirety, by reference.

FIELD

Embodiments of the present invention relate generally to image management, and more specifically to systems and methods for organizing, displaying, and visualizing a set of images.

BACKGROUND

With the wide availability of imaging and sensor devices, there has been a tremendous growth in the volume of image/video data. Globally, it is estimated that at any second, there are over 1 trillion photos available online from web pages, social media, ad photos, etc. According to a forecast from Cisco VNI Mobile 2012, global mobile data traffic will grow to 10.8 exabytes per month by 2016, and over 70% of mobile data will be video.

Similarly, at the individual level, consumers now tend to generate significant amount of personal photos. With the proliferation of high-end smartphones, tablets, cameras, and camcorders, the volume of these personal photos is expected to grow phenomenally. The volume, velocity, and variety of photos being captured and generated can make it challenging to organize and manage captured images. It can be time-consuming and tedious to review, organize and categorize the large number of images being captured, and as a result, users may leave their photos unorganized, or merely arranged in the order they were uploaded or stored.

Similarly, the large volume of images makes it difficult to navigate collections of images to identify a particular image or image type. Again this process can be time-consuming, and may be overwhelming when the collection of images becomes large.

SUMMARY

In accordance with a first embodiment described herein, there is provided a computer-implemented method of organizing a plurality of images. The method can include for each image in the plurality of images, operating a computer processor to determine at least one image allocation criteria, the at least one image allocation criteria including at least one image-specific allocation criteria, where the at least one image-specific allocation criteria includes a similarity distance between that image and at least one other image in the plurality of images measuring how similar in appearance that image and the at least one other image are. The method can further include allocating the plurality of images into a plurality of groups of images such that each image in the plurality of images is allocated to at least one group in the plurality of groups of images using the image allocation criteria for each image, where the plurality of groups of images includes a plurality of similar image groups. The plurality of images can be divided into the plurality of similar image groups by allocating each image in the plurality of images to one of the similar image groups based on the at least one image-specific allocation criteria for that image.

In some embodiments, the method can further include, for each image in the plurality of images, determining the similarity distance between that image and the at least one other image in the plurality of images by comparing image-specific pixel content of at least some pixels of that image with image-specific pixel content of at least some pixels of the at least one other image to measure how similar in appearance that image and the at least one other image are.

In some embodiments, the method can further include determining a plurality of display groups as a subset of groups from the plurality of groups of images; determining a plurality of representative images by, for each display group in the plurality of display groups, determining a representative image for representing all of the images in that display group; and concurrently displaying the plurality of representative images on a computer device display.

In some embodiments, the method can further include, for at least one display group in the plurality of display groups, that display group including a number of images greater than a threshold number of images where the threshold number of images is an integer greater than 1: determining a plurality of subgroups of images for that display group where each image in that display group is allocated to one of the subgroups of images, and determining a plurality of subgroup representative images by, for each subgroup in that display group, determining a subgroup representative image representing all of the images in that subgroup.

In some embodiments, the method can further include, for at least one display group in the plurality of display groups, that display group including a number of images greater than a threshold number of images, the threshold number of images being an integer greater than 1: determining a plurality of subgroups of images for that display group where each image in that display group is allocated to one of the subgroups of images. The representative image for that display group can be determined by: determining a plurality of subgroup representative images, one subgroup representative image for each subgroup of images in the plurality of subgroups of images, and generating the representative image for that display group to include a plurality of representative image portions, each representative image portion including the subgroup representative image for one of the subgroups of images in the plurality of subgroups of images.

In some embodiments, for a particular display group in the at least one display group, the plurality of subgroups of images can include a first similar image group from the plurality of similar image groups, the first similar image group including a plurality of first similar images, each first similar image having a similarity distance between that first similar image and at least one of the other first similar images within a similarity threshold range. The subgroup representative image can be determined for the first similar image group by selecting a plurality of representative first similar images from the plurality of first similar images; and generating the subgroup representative image for the first similar image group to include at least a portion of each representative first similar image in the plurality of representative first similar images.

In some embodiments, generating the subgroup representative image for the first similar image group may include partially overlapping each of the representative first similar images.

In some embodiments, the plurality of subgroups of images for the particular display group may also include at least one additional similar image group from the plurality of similar image groups, with each additional similar image group including a plurality of additional similar images, and for each additional similar image group each additional similar image in that additional similar image group can have a similarity distance between that additional similar image and at least one of the other additional similar images in that additional similar image group within the similarity threshold range for that additional similar image group. The plurality of first similar images and each plurality of additional similar images can be disjoint and each plurality of additional similar images can be disjoint from every other plurality of additional similar images. For each additional similar image group, the subgroup representative image can be determined by selecting a plurality of representative additional similar images from the plurality of additional similar images in that additional similar image group, and generating the subgroup representative image for the additional similar image group to include at least a portion of each representative additional similar image in the plurality of representative additional similar images.

In some embodiments, the method can further include providing a user interface in association with the computer device display for receiving an input from a user and receiving the input from the user. The method may include determining a selected representative image in the plurality of representative images based on the input from the user, where the selected representative image is the representative image for a selected display group from the plurality of display groups and the selected display group includes a number of images greater than a threshold number of images, where the threshold number of images is an integer greater than 1. The method can further include determining an allocated screen size of the computer device display for the selected display group and determining if the allocated screen size of the computer device display is sufficient to concurrently display the number of images in the selected display group. The method can include, displaying the images in the selected display group on the computer device display if the allocated screen size of the computer device display is sufficient, and if the allocated screen size of the computer device display is not sufficient, the method may include determining a plurality of subgroups of images for the selected display group where each image in the selected display group is allocated to one of the subgroups of images, determining a plurality of representative images for the determined plurality of subgroups of images by, for each subgroup in the selected display group, determining a representative image for that subgroup representing all of the images in that subgroup, and displaying, on the computer device display, the plurality of representative images for the determined plurality of subgroups of images.

In some embodiments, the method can further include, for at least one display group in the plurality of display groups, each display group in the at least one display group including a number of images greater than a threshold number of images, where the threshold number of images is an integer greater than 1, determining the representative image for each display group in the at least one display group by selecting a subset of representative group images, the subset of representative group images including at least two of the images in that display group, and generating the representative image to include at least a portion of each representative group image in the selected subset of representative group images.

In some embodiments, the method can further include, for each display group in the at least one display group determining a maximum representative image size for that display group based on an allocated display size of the computer device display for the plurality of display groups and generating the representative image for that display group to have a total image size greater than the maximum representative image size for that display group. The method can also include displaying the representative image for that display group by displaying a portion of the representative image, where the displayed portion of the representative image has a portion size no greater than the maximum representative image size.

In some embodiments, for a particular display group in the at least one display group, displaying the representative image for the particular display group may include successively displaying each portion of the representative image for the particular display group.

In some embodiments, the method may further include generating the representative image by generating a perspective projection of each representative group image in the selected subset of representative group images, and generating the representative image to include at least a portion of the perspective projection for each representative group image in the selected subset of representative group image.

In some embodiments, the method may include generating the representative image to include at least a portion of the perspective projection for each representative group image in the selected subset of representative group image by overlapping the perspective projections for each representative group image in the selected subset of representative group images.

In some embodiments, the representative image may have a first peripheral boundary and a second peripheral boundary opposite the first peripheral boundary. The perspective projections for each representative group image in the selected subset of representative group images can be initially overlapped so that the perspective projection of a first representative group image from the selected subset of representative group images overlaps the perspective projection of at least one additional representative group image from the selected subset of representative group images. The perspective projection of the first representative group image can be proximate the first peripheral boundary and the perspective projection of each additional representative group image can be increasingly displaced from the perspective projection of the first representative group image in a first direction towards the second peripheral boundary. Displaying the representative image may include progressively moving the perspective projection of each representative group image in the selected subset of representative group images in a second direction towards the first peripheral boundary, and removing the perspective projection of each representative group image in the selected subset of representative group images from the representative image when that perspective projection reaches a threshold location proximate the first peripheral boundary.

In some embodiments, the method may further include displaying the representative image by progressively introducing the perspective projection of each representative group image in the selected subset of representative group images into the representative image proximate the second peripheral boundary, moving the perspective projection of each representative group image towards the first peripheral boundary and then removing the perspective projection of each representative group image from the representative image when that perspective projection reaches the threshold location.

In some embodiments, the perspective projection for each representative group image can be substantially opaque when introduced into the representative image and gradually become at least semitransparent as it moves towards the first peripheral boundary.

In some embodiments, the perspective projection of each representative group image in the selected subset of representative group images can be generated at a first projection angle. The method may further include providing a user interface in association with the computer device display for receiving an input from a user, receiving the input from the user, and based on the input from the user, re-generating the representative image to include at least a portion of a second perspective projection for each representative group image in the selected subset of representative group images, the second perspective projection being generated at a second projection angle, where the second projection angle is different from the first projection angle.

In some embodiments, the method can further include determining a maximum representative image size for each display group by identifying an allocated display size of the computer device display for the plurality of display groups, dividing the allocated display size into a plurality of display group portions, one display group portion for each display group in the plurality of display groups, determining the maximum representative image size for each display group as a size of the display group portion for that display group, and determining the representative image for each display group in the plurality of display groups to have a representative image size no greater than the maximum representative image size for that display group.

In some embodiments, the method can further include providing a user interface in association with the computer device display for receiving an input from a user, receiving the input from the user, and based on the input from the user, determining a selected representative image in the plurality of representative images, the selected representative image being the representative image for a selected display group from the plurality of display groups, and the selected display group including a number of images greater than a threshold number of images, the threshold number of images being an integer greater than 1. The method may further include determining a plurality of display subgroups for the selected display group by: determining a plurality of subgroups of images for the selected display group where each image in the selected display group is allocated to at least one of the subgroups of images, the plurality of subgroups of images including a plurality of subgroup levels with each subgroup levels including a plurality of disjoint level-specific subgroups, determining an allocated screen size of the computer device display for the selected display group, determining a threshold number of display subgroups by identifying a maximum number of representative images that are concurrently displayable in the allocated screen size with each representative image having an image size no greater than a maximum representative image size, identifying a display subgroup level from the plurality of subgroup levels by identifying the subgroup level having the greatest number of level-specific subgroups not more than the threshold number of display subgroups and where each image in the selected display group is allocated to at least one of the level-specific subgroups in that subgroup level, and identifying the plurality of display subgroups as the plurality of level-specific subgroups in the display subgroup level. The method can further include determining a plurality of representative images for the plurality of display subgroups by, for each display subgroup in the plurality of display subgroups, determining a representative image for representing all of the images in that display subgroup, the representative image having an image size no greater than the representative image size, and concurrently displaying the plurality of representative images for the plurality of display subgroups on the computer device display.

In some embodiments, the method may include determining the at least one image allocation criteria for each image in the plurality of images by assigning an access level to that image, the access level representing image management restrictions for that image, and each image can be allocated to the at least one group in the plurality of groups of images by allocating that image to at least one group having image management restrictions corresponding to the access level of that image.

In some embodiments, the method may include determining the at least one image allocation criteria for each image in the plurality of images by determining at least one metadata allocation criteria from image metadata associated with that image, and allocating that image to a particular group in the plurality of groups of images based on the at least one metadata allocation criteria for that image.

In accordance with a further example embodiment described herein, there is provided a computer program product for use on a computing device to organize a plurality of images, the computer program product can include a non-transitory recording medium and instructions recorded on the recording medium. The instructions can include instructions for configuring a processor of the computing device to for each image in the plurality of images, determine at least one image allocation criteria, the at least one image allocation criteria including at least one image-specific allocation criteria, where the at least one image-specific allocation criteria includes a similarity distance between that image and at least one other image in the plurality of images measuring how similar in appearance that image and the at least one other image are, and allocate the plurality of images into a plurality of groups of images such that each image in the plurality of images is allocated to at least one group in the plurality of groups of images using the image allocation criteria for each image, where the plurality of groups of images includes a plurality of similar image groups and the plurality of images are divided into the plurality of similar image groups by allocating each image in the plurality of images to one of the similar image groups based on the at least one image-specific allocation criteria for that image.

In some embodiments, the computer program product may further include instructions for configuring the processor to for each image in the plurality of images, determine the similarity distance between that image and the at least one other image in the plurality of images by comparing image-specific pixel content of at least some pixels of that image with image-specific pixel content of at least some pixels of the at least one other image to measure how similar in appearance that image and the at least one other image are.

In some embodiments, the computer program product may further include instructions for configuring the processor to determine a plurality of display groups as a subset of groups from the plurality of groups of images, determine a plurality of representative images by, for each display group in the plurality of display groups, determining a representative image for representing all of the images in that display group, and concurrently display the plurality of representative images on a display of the computing device.

In some embodiments, the computer program product may further include instructions for configuring the processor to, for at least one display group in the plurality of display groups, that display group including a number of images greater than a threshold number of images, the threshold number of images being an integer greater than 1: determine a plurality of subgroups of images for that display group where each image in that display group is allocated to one of the subgroups of images, and determine a plurality of subgroup representative images by, for each subgroup in that display group, determining a subgroup representative image representing all of the images in that subgroup.

In some embodiments, the computer program product may further include instructions for configuring the processor to, for at least one display group in the plurality of display groups, that display group including a number of images greater than a threshold number of images, the threshold number of images being an integer greater than 1: determine a plurality of subgroups of images for that display group where each image in that display group is allocated to one of the subgroups of images. The computer program product may further include instructions for configuring the processor determine the representative image for that display group by determining a plurality of subgroup representative images, one subgroup representative image for each subgroup of images in the plurality of subgroups of images, and generating the representative image for that display group to include a plurality of representative image portions, each representative image portion including the subgroup representative image for one of the subgroups of images in the plurality of subgroups of images.

In some embodiments, for a particular display group in the at least one display group, the plurality of subgroups of images can include a first similar image group from the plurality of similar image groups, the first similar image group including a plurality of first similar images, each first similar image having a similarity distance between that first similar image and at least one of the other first similar images within a similarity threshold range. The computer program product may further include instructions for configuring the processor to determine the subgroup representative image for the first similar image group by selecting a plurality of representative first similar images from the plurality of first similar images, and generating the subgroup representative image for the first similar image group to include at least a portion of each representative first similar image in the plurality of representative first similar images.

In some embodiments, the computer program product may further include instructions for configuring the processor to generate the subgroup representative image for the first similar image group by partially overlapping each of the representative first similar images.

In some embodiments, for a particular display group the plurality of subgroups of images can further include at least one additional similar image group from the plurality of similar image groups, each additional similar image group including a plurality of additional similar images, and for each additional similar image group each additional similar image in that additional similar image group has a similarity distance between that additional similar image and at least one of the other additional similar images in that additional similar image group within the similarity threshold range for that additional similar image group. The plurality of first similar images and each plurality of additional similar images can be disjoint and each plurality of additional similar images can be disjoint from every other plurality of additional similar images. The computer program product may further include instructions for configuring the processor to determine the subgroup representative image for each additional similar image group by: selecting a plurality of representative additional similar images from the plurality of additional similar images in that additional similar image group, and generating the subgroup representative image for the additional similar image group to include at least a portion of each representative additional similar image in the plurality of representative additional similar images.

In some embodiments, the computer program product may further include instructions for configuring the processor to provide a user interface in association with the display of the computing device for receiving an input from a user, receive the input from the user, and based on the input from the user, determine a selected representative image in the plurality of representative images, the selected representative image being the representative image for a selected display group from the plurality of display groups, the selected display group including a number of images greater than a threshold number of images, the threshold number of images being an integer greater than 1. The computer program product can further include instructions for configuring the processor to determine an allocated screen size of the computer device display for the selected display group, determine if the allocated screen size of the computer device display is sufficient to concurrently display the number of images in the selected display group, and if the allocated screen size of the computer device display is sufficient, then display the images in the selected display group on the computer device display. The computer program product can further include instructions for configuring the processor to, if the allocated screen size of the computer device display is not sufficient, then determine a plurality of subgroups of images for the selected display group where each image in the selected display group is allocated to one of the subgroups of images, determine a plurality of representative images for the determined plurality of subgroups of images by, for each subgroup in the selected display group, determining a representative image for that subgroup representing all of the images in that subgroup, and display the plurality of representative images for the determined plurality of subgroups of images on the display of the computing device.

In some embodiments, the computer program product may further include instructions for configuring the processor to, for at least one display group in the plurality of display groups, each display group in the at least one display group including a number of images greater than a threshold number of images, the threshold number of images being an integer greater than 1, determine the representative image for each display group in the at least one display group by selecting a subset of representative group images, the subset of representative group images including at least two of the images in that display group, and generating the representative image to include at least a portion of each representative group image in the selected subset of representative group images.

In some embodiments, the computer program product may further include instructions for configuring the processor to, for each display group in the at least one display group, determine a maximum representative image size for that display group based on an allocated display size of the computer device display for the plurality of display groups, generate the representative image for that display group to have a total image size greater than the maximum representative image size for that display group; and display the representative image for that display group by displaying a portion of the representative image, where the displayed portion of the representative image has a portion size no greater than the maximum representative image size.

In some embodiments, the computer program product may further include instructions for configuring the processor to, for a particular display group in the at least one display group, display the representative image for the particular display group by successively displaying each portion of the representative image for the particular display group.

In some embodiments, the computer program product may further include instructions for configuring the processor to generate the representative image by generating a perspective projection of the each representative group image in the selected subset of representative group images, and generating the representative image to include at least a portion of the perspective projection for each representative group image in the selected subset of representative group image.

In some embodiments, the computer program product may further include instructions for configuring the processor to generate the representative image to include at least a portion of the perspective projection for each representative group image in the selected subset of representative group images by overlapping the perspective projections for each representative group image in the selected subset of representative group image.

In some embodiments, the representative image can have a first peripheral boundary and a second peripheral boundary opposite the first peripheral boundary, and the computer program product may further include instructions for configuring the processor to initially overlap the perspective projections for each representative group image in the selected subset of representative group images so that the perspective projection of a first representative group image from the selected subset of representative group images overlaps the perspective projection of at least one additional representative group image from the selected subset of representative group images, where the perspective projection of the first representative group image is proximate the first peripheral boundary and the perspective projection of each additional representative group image are increasingly displaced from the perspective projection of the first representative group image in a first direction towards the second peripheral boundary, and display the representative image by: progressively moving the perspective projection of each representative group image in the selected subset of representative group images in a second direction towards the first peripheral boundary, and removing the perspective projection of each representative group image in the selected subset of representative group images from the representative image when that perspective projection reaches a threshold location proximate the first peripheral boundary.

In some embodiments, the computer program product may further include instructions for configuring the processor to display the representative image by progressively introducing the perspective projection of each representative group image in the selected subset of representative group images into the representative image proximate the second peripheral boundary, moving the perspective projection of each representative group image towards the first peripheral boundary and then removing the perspective projection of each representative group image from the representative image when that perspective projection reaches the threshold location.

In some embodiments, the computer program product may further include instructions for configuring the processor to introduce the perspective projection for each representative group image into the representative image substantially opaque and gradually adjust the perspective projection for each representative group image to become at least semitransparent as it moves towards the first peripheral boundary.

In some embodiments, the computer program product may further include instructions for configuring the processor to generate the perspective projection of each representative group image in the selected subset of representative group images at a first projection angle, provide a user interface in association with the display of the computing device for receiving an input from a user, receive the input from the user, and based on the input from the user, re-generate the representative image to include at least a portion of a second perspective projection for each representative group image in the selected subset of representative group images, the second perspective projection being generated at a second projection angle, where the second projection angle is different from the first projection angle.

In some embodiments, the computer program product may further include instructions for configuring the processor to determine a maximum representative image size for each display group by identifying an allocated display size of the display for the plurality of display groups, dividing the allocated display size into a plurality of display group portions, one display group portion for each display group in the plurality of display groups, and determining the maximum representative image size for each display group as a size of the display group portion for that display group; and determine the representative image for each display group in the plurality of display groups to have a representative image size no greater than the maximum representative image size for that display group.

In some embodiments, the computer program product may further include instructions for configuring the processor to provide a user interface in association with the display for receiving an input from a user, receive the input from the user, based on the input from the user, determine a selected representative image in the plurality of representative images, the selected representative image being the representative image for a selected display group from the plurality of display groups, and the selected display group including a number of images greater than a threshold number of images, the threshold number of images being an integer greater than 1. The computer program product may further include instructions for configuring the processor to determine a plurality of display subgroups for the selected display group by: determining a plurality of subgroups of images for the selected display group where each image in the selected display group is allocated to at least one of the subgroups of images, the plurality of subgroups of images including a plurality of subgroup levels each subgroup levels including a plurality of disjoint level-specific subgroups, determining an allocated screen size of the computer device display for the selected display group, determining a threshold number of display subgroups by identifying a maximum number of representative images that are concurrently displayable in the allocated screen size with each representative image having an image size no greater than a maximum representative image size, identifying a display subgroup level from the plurality of subgroup levels by identifying the subgroup level having the greatest number of level-specific subgroups not more than the threshold number of display subgroups where each image in the selected display group is allocated to at least one of the level-specific subgroups in that subgroup level, identifying the plurality of display subgroups as the plurality of level-specific subgroups in the display subgroup level, determine a plurality of representative images for the plurality of display subgroups by, for each display subgroup in the plurality of display subgroups, determining a representative image for representing all of the images in that display subgroup, the representative image having an image size no greater than the representative image size, and concurrently display the plurality of representative images for the plurality of display subgroups on the display.

In some embodiments, the computer program product may further include instructions for configuring the processor to determine the at least one image allocation criteria for each image in the plurality of images by assigning an access level to that image, the access level representing image management restrictions for that image, and allocate each image to the at least one group in the plurality of groups of images by allocating that image to at least one group having image management restrictions corresponding to the access level of that image.

In some embodiments, the computer program product may further include instructions for configuring the processor to determine the at least one image allocation criteria for each image in the plurality of images by determining at least one metadata allocation criteria from image metadata associated with that image, and allocating that image to a particular group in the plurality of groups of images based on the at least one metadata allocation criteria for that image.

In accordance with a further example embodiment described herein, there is provided a device for organizing a plurality of images. The device can include a processor, a display, and a non-volatile device memory. The non-volatile device memory can have instructions stored thereon for configuring the processor to determine a plurality of groups of images, the plurality of groups of images being defined by allocating each image in the plurality of images to at least one group in the plurality of groups of images using at least one image allocation criteria determined for each image, the image allocation criteria for each image including at least one image-specific allocation criteria, where the at least one image-specific allocation criteria includes a similarity distance between that image and at least one other image in the plurality of images measuring how similar in appearance that image and the at least one other image are, and the plurality of groups of images includes a plurality of similar image groups with the plurality of images divided into the plurality of similar image groups by allocating each image in the plurality of images to one of the similar image groups based on the at least one image-specific allocation criteria for that image; determine a plurality of display groups as a subset of groups from the plurality of groups of images; determine a plurality of representative images, one representative image for each display group in the plurality of display groups, the representative image for each display group representing all of the images in that display group; and concurrently display the plurality of representative images on the display.

BRIEF DESCRIPTION OF DRAWINGS

For a better understanding of the described embodiments and to show more clearly how they may be carried into effect, reference will now be made, by way of example, to the accompanying drawings in which.

DETAILED DESCRIPTION

Figure 1:
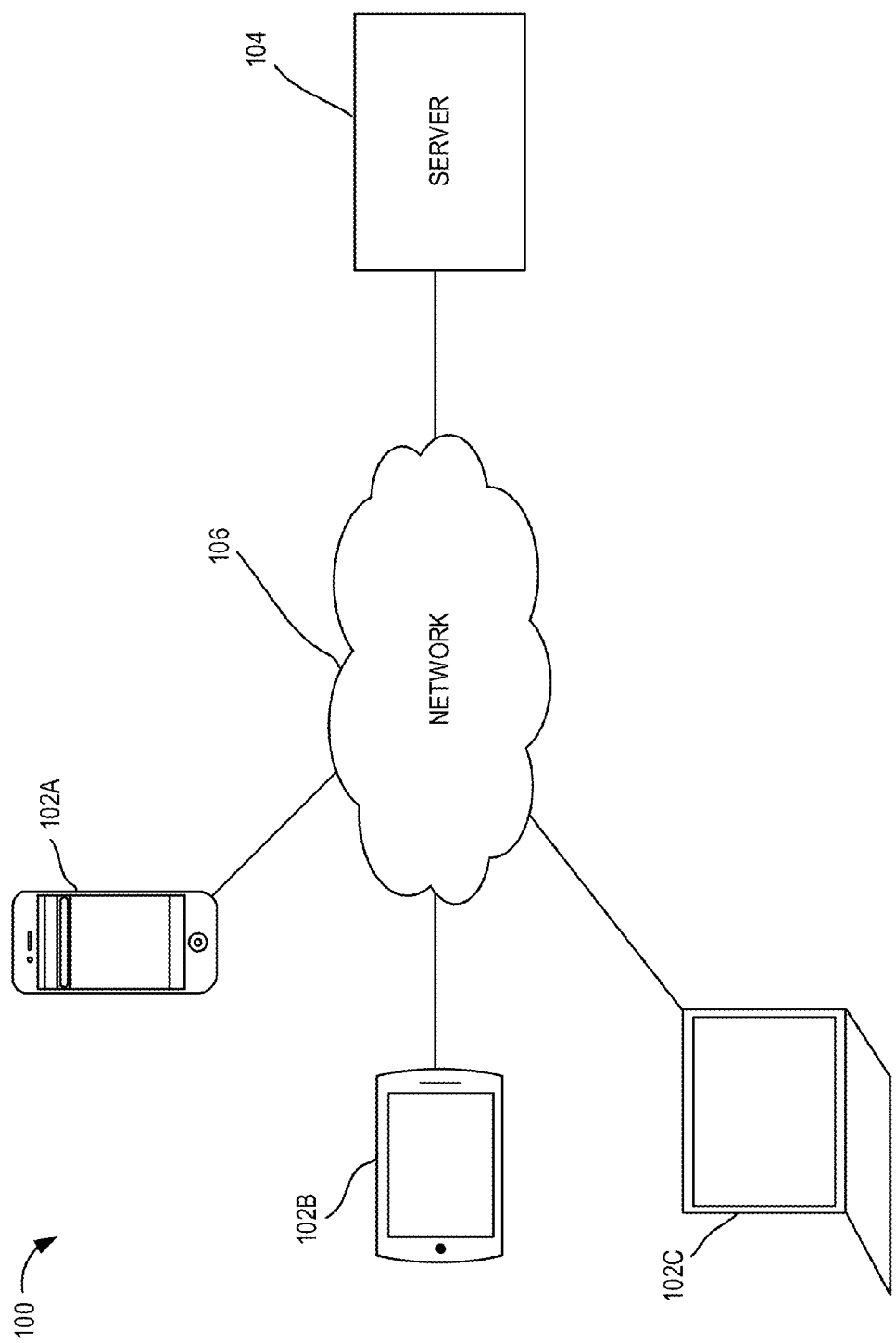
FIG. 1 shows a block diagram of a system that can be used to organize images in accordance with an embodiment.

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the drawings and the description is not to be considered as limiting the scope of the embodiments described herein in any way, but rather as merely describing the implementation of the various embodiments described herein.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems, processes and methods described herein may be implemented in hardware or software, or a combination of both. Alternatively, these embodiments may also be implemented in computer programs executed on programmable computers each comprising at least one processor (e.g., a microprocessor), a data storage system (including volatile and non-volatile memory and/or storage elements), at least one input device, and at least one output device. For example and without limitation, the programmable computers (or computing devices) may be a personal computer, laptop, personal data assistant, cellular telephone, smart-phone device, tablet computer, and/or wireless device. For any software components, program code can be applied to input data to perform the functions described herein and generate output information. The output information can also be applied to one or more output devices, in known fashion.

Each software component or program may be implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

In general, embodiments of the systems and methods described herein can be used to organize a plurality of images. Embodiments described herein may use various techniques to manage, display, and visualize a set of images. For example, various embodiments described herein may use hierarchical structures, 3D visualization techniques, and pixel content analytics of images to organize, display and visualize images and groups of images. Furthermore, various embodiments described herein may allow images to be more easily managed and viewed on devices with display screens of limited size, such as smartphones or tablets.

For example, a user may capture images using various devices such as a smartphone, tablet and/or digital camera among others. The user may store these images using one or more storage devices, such as a laptop computer, desktop computer, tablet, cloud server, memory storage device (e.g. a USB key). Over time, the user may accumulate a large collection of images. As a result, it can become difficult for the user to keep track of and manage all the images in the collection. If the user is not proactive in constantly and consistently organizing and updating the storage of their images, subsequent retrieval of images can be a tedious and time-consuming task. As well, users may often have difficulty associating similar images captured at different times or using different devices.

Figure 2:
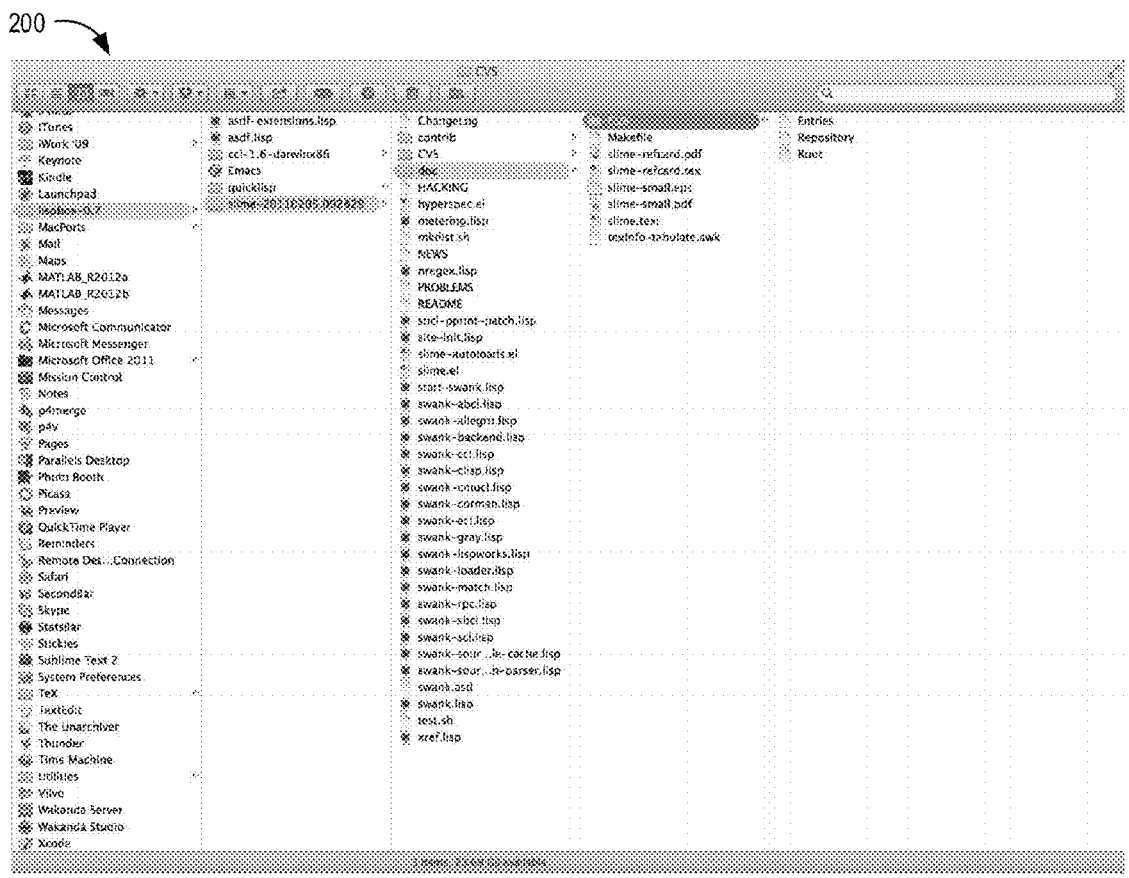
FIG. 2 shows a screenshot of a prior art system for organizing images.

In general, a user may use file structures provided by operating systems such as MAC OS X 10.9.3 to organize files such as images. These systems may employ hierarchical (or tree) structures to organize files. FIG. 2 shows a screenshot 200 of how files can be organized in a file manager software (called Finder) of MAC OS X 10.9.3.

As screenshot 200 shows, a hierarchical file system may include files and folders, in which a folder may contain one or multiple folders and files. A folder (usually represented by a small icon) can be a concise representation of all files that it contains. When users select, move, or delete a folder, users' inputs may apply to all files in that folder. Typically, users manually organize personal files in such file systems, i.e. folders are created and files are manually added into those folders by users. In some cases, when users click an icon of a folder (e.g. "CVS" highlighted in FIG. 2), only icons for folders and files directly under this folder will be shown or appended to the display screen.

As mentioned above, this process of organizing images can be time-consuming and may require constant maintenance on the part of a user to update and re-allocate images to different groups. As a result, users may tend to leave images in default folders such as those generated by each image capture device (typically based on the time the image was captured). A user's image collection may then become scattered with images in multiple, disjoint folders for each image capture device or method. As well, it requires constant attention and effort on the part of the user to generate a user-friendly structure for the image collection.

In embodiments described herein, to organize a plurality of images, image allocation criteria can be determined for each image in the plurality of images. The image allocation criteria for each image can include at least one image-specific allocation criteria that includes a similarity distance between that image and at least one other image in the plurality of images. The similarity distance between a first image and at least one other image may measure how similar in appearance the first image and the at least one other image are.

The plurality of images can then be allocated into a plurality of groups of images so that each image is allocated to at least one of the groups in the plurality of groups. In some cases, the plurality of groups may be organized in a hierarchical structure with a plurality of group levels or subgroup levels. The groups at higher levels in the hierarchical structure typically include at least one subgroup at a lower level (though, for example, if a group includes only a single image it may not include any subgroups). Each image allocated to a group at one level can then be allocated to one of the subgroups of that group at the next lower level.

Each group may be shown to a user by a representative image (also referred to as a representative icon) representing the images allocated to that group. After a user selects a group, the system can display representative images of the subgroups below that group. In some embodiments, if a group contains more images than its allocated display screen space can handle, the computing device can automatically determine which images from the group are selected as representative group images for the group for display within the allocated display screen space. The computing device may also determine how the representative group images for the group are displayed within the allocated display screen space.

For those representative icons that are too large to fit in their respective allocated display screen spaces, the representative icons can be animated to change over time to show all the representative image portions inside each of those representative icons to users by trading display time for display space. In some embodiments, once an animation button is clicked or tapped, a larger screen space window pops up and representative image portions contained in the corresponding representative icon can be automatically played inside the larger screen space window for users. In some embodiments, the animation may fit within the allocated display screen space for a representative icon.

For example, if images are allocated to a group based on the year in which those images were capture, the group may include 12 month sub-groups corresponding to the month in which an image was captured. Each image allocated to the group for a particular year can then be allocated to a sub-group for a particular month. However, it should be apparent that the hierarchical structure is not limited to one particular hierarchy of groups and subgroups. For instance, if a user were interested in images from a particular month, they may select that month and the images from the month group could be allocated to subgroups based on year. The user could then select a particular year from which to review images if so desired.

In general, the plurality of groups can include a plurality of similar image groups. Similar image groups can be defined to include images that are similar to at least one other image in that group within a similarity threshold range. The plurality of images can be divided into a plurality of similar image groups by allocating each image in the plurality of images to one of the similar images groups based on the image-specific allocation criteria for that image.

As mentioned above, the image-specific allocation criteria can include a similarity distance between an image and at least one other image. The similarity distance can be determined by comparing image-specific pixel content of at least some of the pixels of that image with image-specific pixel content of at least some pixels of the at least one other image to measure how similar in appearance that image and the at least one other image are.

Once the images have been allocated into groups, a plurality of display groups can be selected as a subset of groups from the plurality of groups of images. For example, the display groups may be initially selected as all of the groups at the top level of a hierarchical structure. Alternatively, the display groups may be selected based on input received from a user indicating a particular group level to be displayed.

A plurality of representative images can be determined for each display group in the plurality of display groups. The representative image for each display group can be determined to represent all of the images in that display group. For example, a representative image may be a single image selected from the images allocated to that display group, or a selection or mosaic determined from multiple images allocated to that display group. The plurality of representative images for each display group can then be displayed on a computer device display.

In effect, the representative image for a display group can operate as an icon (a representative icon) for that display group that may provide a visual indication to a user of the images allocated to that display group. This may allow the user to easily determine which subgroup they wish to select based on the representation of the images allocated to that group.

Referring now to FIG. 1, shown therein is an example embodiment of a system 100 that can be used to organize, display and visualize images. System 100 includes a plurality of computing devices 102A-102C. In general, embodiments of the methods for organizing, displaying and visualizing images described herein can be implemented on each of the computing devices 102A-102C.

In some embodiments, the computing devices 102A-102C may have reduced or limited display space available. As a result, it may be difficult to organize, manage, and navigate a large collection of images using traditional hierarchical file structures such as the structure shown in screenshot 200. Embodiments of the methods described herein may enable simpler and more accessible organization and navigation of images on such devices.

For example, some embodiments can automatically allocate images to a plurality of groups based on metadata and/or image-specific pixel content of the images. Thus, when images are captured, a user is not required to manually generate a hierarchical structure. As well, the user does not need to continually update the allocation of images to the different folders and sub-folders because the images can be allocated automatically.

Embodiments described herein may use representative images and visualization techniques to allow a user to identify the images or types of images within a particular group. The representative images may be determined to represent all the images within a group even when the allocated screen size of the computer device display for that group is small. Some embodiments may also determine particular groups or sub-groups to be displayed based on the allocated screen size of the particular computing device 102 to maximize the information being displayed to a user, while still providing an easy-to-navigate user interface.

Embodiments described herein may provide systems and methods to display, visualize, and manage a set of images in a computing device which may have a display screen of limited size, such as a smartphone, tablet, computer, or any other type of smart electronic device. Various different types of computing devices 102 can be used with system 100 such as one or more smartphones 102A, tablets 102B, notebook computers 102C, desktop computers, PDAs, or other programmable computers. The programmable computers may include a connection with a network such as network 106. Network 106 may be a wired or wireless connection to the Internet. In some cases, the network 106 may include other types of computer or telecommunication networks.

In some embodiments, each of the programmable computers may include an input device for entering information into the device. For example, the input device may be a keyboard, key pad, cursor-control device, touch-screen, camera, scanner or microphone. In some embodiments, the computing device 102 may recognize certain inputs from users such as "click" (may also be called "tap" or any other name) and "scroll" inputs (may also be called "gestures" or any other name) from users. In some embodiments, input information may be received through the communication interface from other programmable computers over a network.

In some embodiments, the computing devices may include a display device for presenting visual information. For example, display device may be a computer monitor, a flat-screen display, a projector or a display panel. In some embodiments, the computer display device displays representative images determined for one or more display groups or displays subgroups determined in accordance with the methods herein. In some embodiments, the computing devices 102 can be configured to display content having a total display size larger than the actual display size of the computing device display. A scrollable view is an example of a graphical user interface (GUI) which displays content having a total display size larger than the actual display size of the computing device display. The scrollable may show partial content at any time, and allow users to scroll up, down, left and right, or any other direction, to exploit the content.

In some embodiments, the computing devices 102 may also be coupled to a server computer such as server 104. Server 104 may be a cloud server that can be used to store a plurality of images. In some instances, for example where the computing device 102 has limited storage space, the computing device 102 may only store low-quality versions or thumbnails of the images for a set of images. The server 104 can store the high-definition images and provide the higher definition images to the computing device 102 as desired using network 106.

In some embodiments, the image allocation criteria may be determined for each image in a plurality of images by the server 104. The server 104 may then define the plurality of groups of images, and allocate each image to at least one of the groups of images. In some such embodiments, the computing device 102 may not determine any of the image allocation criteria for at least some of the images, and may simply receive from the server 104 an indication of the allocation of images to the plurality of groups. The computing device 102 may then display a user interface to allow navigation of the groups defined by the server 104. In alternative embodiments, the computing device 102 can also be configured to determine the image allocation criteria for at least one image, and to allocate images to groups of images.

Figure 3:
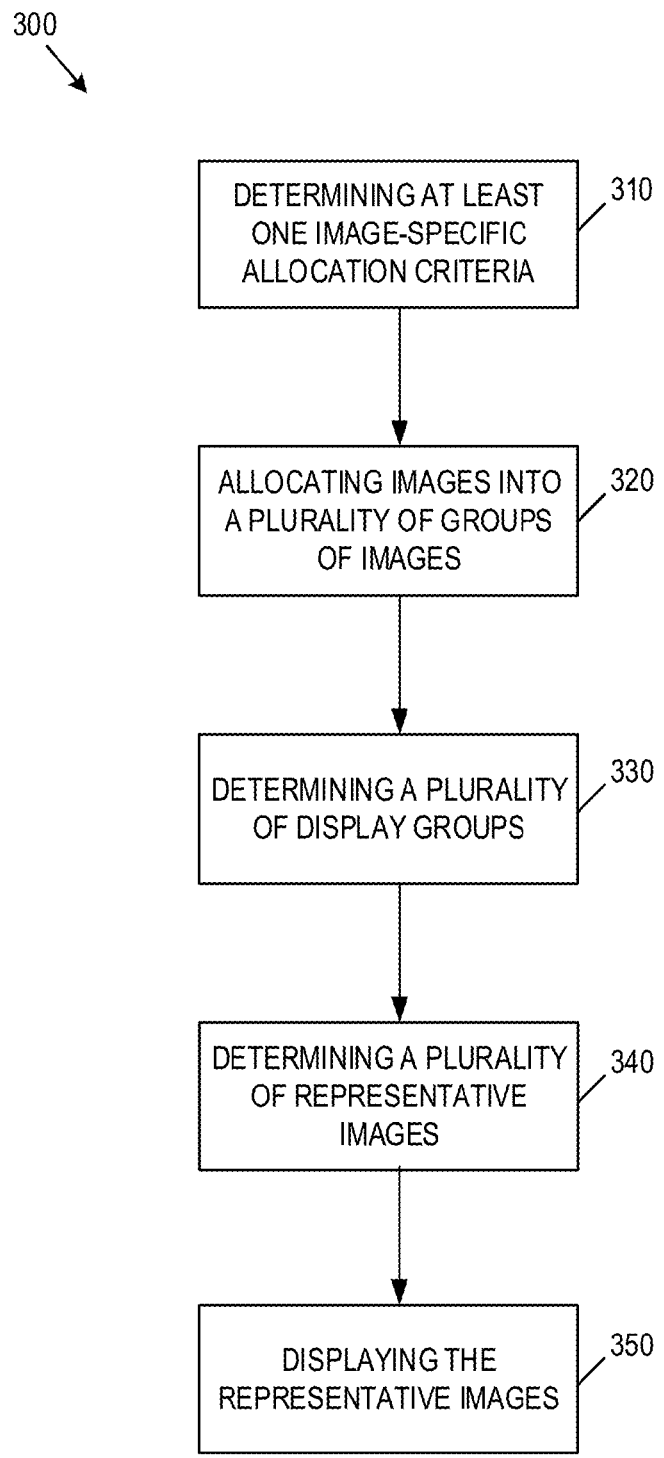
FIG. 3 shows a flowchart of an example embodiment of a method for organizing images in accordance with an embodiment.

Referring now to FIG. 3, shown therein is an example method 300 for organizing a plurality of images. Method 300 may be implemented using various components of system 100, such as a computing device 102.

At 310, a processor of computing device 102 can determine at least one image allocation criteria for each image in the plurality of images. The at least one image allocation criteria can include at least one image-specific allocation criteria. Image-specific allocation criteria can include derived pixel content attributes (such as pixel content similarity, face detection/recognition information, and other pixel content related information). In general, derived pixel content attributes may refer to attributes of an image that are determined by analysis of individual pixels or groups of pixels in that image. The processor of computing device 102 can determine the image-specific allocation criteria by analyzing the pixel content of one or more images, and comparing the pixel content with analyzed pixel content of other images.

For each image, the image-specific allocation criteria can include a similarity distance between that image and at least one other image in the plurality of images measuring how similar in appearance that image and the at least one other image are. The computing device 102 can determine the similarity distance between a particular image and at least one other image in the plurality of images by comparing image-specific pixel content of at least some pixels of that image with image-specific pixel content of at least some pixels of the at least one other image to measure how similar in appearance that image and the at least one other image are.

In some embodiments, the at least one image allocation criteria for an image can include at least one metadata allocation criteria determined from image metadata associated with that image. The at least one metadata allocation criteria can include various metadata attributes stored with an image such as time, location, event, tag information, etc.

In some embodiments, the at least one image allocation criteria for each image in the plurality of images may include an access level assigned to that image. The access level can represent image management restrictions for that image.

For example, images may be assigned access levels of Open (O), Private (P), Quarantined (Q) or Archived (R). The access levels may be assigned based on user input. For convenience, images assigned each of the O, P, Q, and R access levels may be referred to as o-images, P-images, Q-images, and R-images, respectively. Images having these different access levels can be managed in different ways.

For example, each O-image including its original full resolution version and a subsequent downsampled version can be stored locally on a device without encryption. Users can be permitted to open, share, and edit O-images. On the other hand, each P-image including its original full resolution version and downsampled version can be encrypted when stored locally in the non-volatile memory of the device. Legitimate users may access P-images after they are verified by the system. Once users are verified, they may move images between O and P access levels through the system.

Images assigned to P access level (either initially when the image is captured, or based on subsequent user input) can be automatically encrypted. When images are moved out from the P access level to either O or R access level or for sharing, the images can be automatically decrypted.

In comparison with P-images, access to Q-images can be more restricted. In some embodiments, not only are Q-images (including their original full resolution versions and downsampled versions) encrypted when stored locally in the non-volatile memory of a device, but they also remain encrypted when they are moved from the device, e.g. to another device or to a server. In those embodiments, the plaintext image of each Q-image may only be viewable by a legitimate user after that user has been verified by the system. After user verification, that Q-image can be decrypted and temporarily stored in the volatile memory of that user's device(s). After that user closes the plaintext image, the system can automatically erase the plaintext image from the device volatile memory.

In some embodiments, no party other than the system may know the encryption and decryption keys for Q-images. As such, Q-images may considered quarantined and "alive" only inside the user's device when the user has been verified, and "dead" as long as they are taken out from a device within the system. Images taken inside or moved to Q Group can be automatically encrypted. In some embodiments, Q-images may not be permitted to have their access levels adjusted to O, P, and R access levels within the system. An example of systems and methods that may be used to provide encryption for Q-images is described in Applicant's co-pending U.S. patent application Ser. No. 14/737,940 filed Jun. 12, 2015 entitled "METHODS, SYSTEMS AND COMPUTER PROGRAM PRODUCT FOR PROVIDING ENCRYPTION ON A PLURALITY OF DEVICES", the disclosure of which is incorporated herein, in its entirety, by reference.

Finally, each R-image may have only its metadata records, down-sampled version, and derived pixel content attributes stored locally in the non-volatile memory of a device. The original full resolution version may be stored on a server such as server 104 which may be connected to the device via a network such as network 106. The full resolution image may be provided to the device by the system if requested by a user using the device.

At 320, the processor of the computing device can allocate the plurality of images into a plurality of groups of images such that each image in the plurality of images is allocated to at least one group in the plurality of groups of images using the image allocation criteria for each image.

Given a set of images, embodiments described herein can automatically build a structure, for example, a hierarchical structure, to display, visualize, and manage that set of images by applying a multiple-stage classifier to that set of images. The hierarchical structure may have several group levels, where the top group level (denoted by Level 0) may correspond to the entire set of images and the bottom group level may correspond to the full resolution of each image within that set of images. In some embodiments, the second bottom group level may correspond to the individual images from that set displayed individually in a downsampled resolution (e.g. a sample of the image with less image resolution than is usually available on the server for that image).

In general, each group level below the top group level may also be referred to as a subgroup level. In some embodiments, a first group or subgroup level may be said to be higher than a second subgroup level if each group of images at the first group level includes one or more subgroups of images at the second group level. In general, each group level may include subgroups corresponding to subsets (or subgroups) of images from the entire image set. In general, each subgroup can be defined to include images having at least some common image allocation criteria. The subgroup level may refer to the allocation criteria used to allocate images to the subgroups of that subgroup level. When a subgroup level is selected, the subgroups can be displayed on the display of a computing device in the form of representative images automatically generated based on those subgroups.

For example, each image can be allocated to a particular group in the plurality of groups of images based on at least one metadata allocation criteria for that image. The metadata allocation criteria may include metadata attributes such as time, location, event, tag information, etc. The image allocation criteria can also include image-specific allocation criteria such as derived pixel content attributes (e.g. pixel content similarity, face detection/recognition information, and other pixel content related information).

The plurality of groups of images can include a plurality of similar image groups. The plurality of images can be divided into the plurality of similar image groups by allocating each image in the plurality of images to one of the similar image groups based on the at least one image-specific allocation criteria for that image.

In some embodiments, the images in the plurality of images can be connected and categorized according to their derived pixel content attributes by establishing a colored graph and identifying connected subgraphs of the colored graph. Each image can be regarded as a vertex of the colored graph. Two images can be connected with some color if their respective derived pixel content attributes satisfy some matching conditions. For each connection color, the colored graph can be decomposed into one or several connected subgraphs. The colored graph itself may correspond to all the images in the plurality of images, whereas each of the connected subgraphs may correspond to a subgroup of images within the plurality of images which share some matching or closely related derived pixel content attributes.

In some embodiments, the derived pixel content attribute of an image can be related to model parameters of a statistical model which models the image (see, for example, E.-H. Yang, X. Yu, J. Meng and C. Sun, "Transparent composite model for DCT coefficients: Design and analysis," IEEE Trans Image Process, vol. 23, no. 3, pp. 1303-1316, March 2014; and E.-H. Yang, X. Yu, J. Meng and C. Sun, "System and method having transparent composite model for transform coefficients," U.S. patent application Ser. No. 14/272,636, May 9, 2014). Two images A and B can be connected with a strong color (red, for example) if a (pixel content) similarity distance between A and B is below a first similarity threshold (i.e. they appear to be similar). The two images can be connected with a weaker color (yellow, for example) if the pixel content similarity distance between A and B is below a second similarity threshold that is higher than the first similarity threshold (The first similarity threshold is lower indicating a closer similarity or smaller similarity distance between two images than the second similarity threshold). In some embodiments, when two images are connected by a strong color, they can also be connected by a weaker color. The images may not be connected at all if the pixel content similarity distance between A and B is above the second similarity threshold.

In some embodiments, the pixel content similarity distance between A and B may be determined using a set mapping induced similarity distance (SMID) or similarity distance metrics derived from SMID (See, for example, E.-H. Yang, X. Yu, and J. Meng, "Methods and systems for determining a perceptual similarity between images," U.S. patent application Ser. No. 14/221,948, Mar. 21, 2014). A group of images can be said to form a weakly similar group (WS Group) if they correspond to a connected subgraph with a weak color (i.e. the similarity distance between each image in that group and at least one other image in that group is below the second similarity threshold). Likewise, a group of images can be said to form a strongly similar group (SS Group) if they correspond to a connected subgraph with a strong color (i.e. the similarity distance between each image in that group and at least one other image in that group is below the first similarity threshold). Images within each WS Group may be considered weakly similar to each other. Images within each SS Group may be considered strongly similar to each other. In some embodiments, each WS Group may be further decomposed into one or several SS Groups.

In some embodiments, each image can be allocated to at least one group in the plurality of groups of images by allocating that image to at least one group having image management restrictions corresponding to an access level assigned to that image. As mentioned above, each image may be assigned an access level. The images can be allocated to separate groups of images for each of the O, P, Q, and R access levels.

In some embodiments, the hierarchical structure can be generated so that the derived pixel content attributes and metadata attributes are used to generate sub-groups for each of the different access levels. For example, in addition to their derived pixel content attributes, images within each of O, P, Q, and R Groups can be categorized according to their metadata such as taken time, location, tag information, etc. (the year, month, and day in which an image was taken may be referred to as the year, month, and day attributes of that image, respectively.) The categories classified according to their metadata attributes can be intersected with categories classified according to their derived pixel content attributes. For example, in some embodiments, images within a group can be categorized into year groups and further into month groups (or month sub-groups for each year group). Images allocated to the same month group may further be grouped into event sub-groups. In some cases, images may be allocated to the same event group if the difference between their taken times is less than an event threshold. These categories may be referred to as Year Groups, Month Groups, and Event Groups, respectively. Each of Year Groups, Month Groups, and Event Groups can be further intersected with and decomposed into WS Groups and SS Groups.

In some embodiments, the plurality of images can be displayed according to the above-mentioned categories or groups. The intersections between the image attributes can be displayed in a hierarchical manner with each group at a lower level being a sub-group of its parent group at a higher level. In general, a group or subgroup can be formed by any one of the image attributes mentioned above or an intersection of two or more image attributes.

Figure 8:
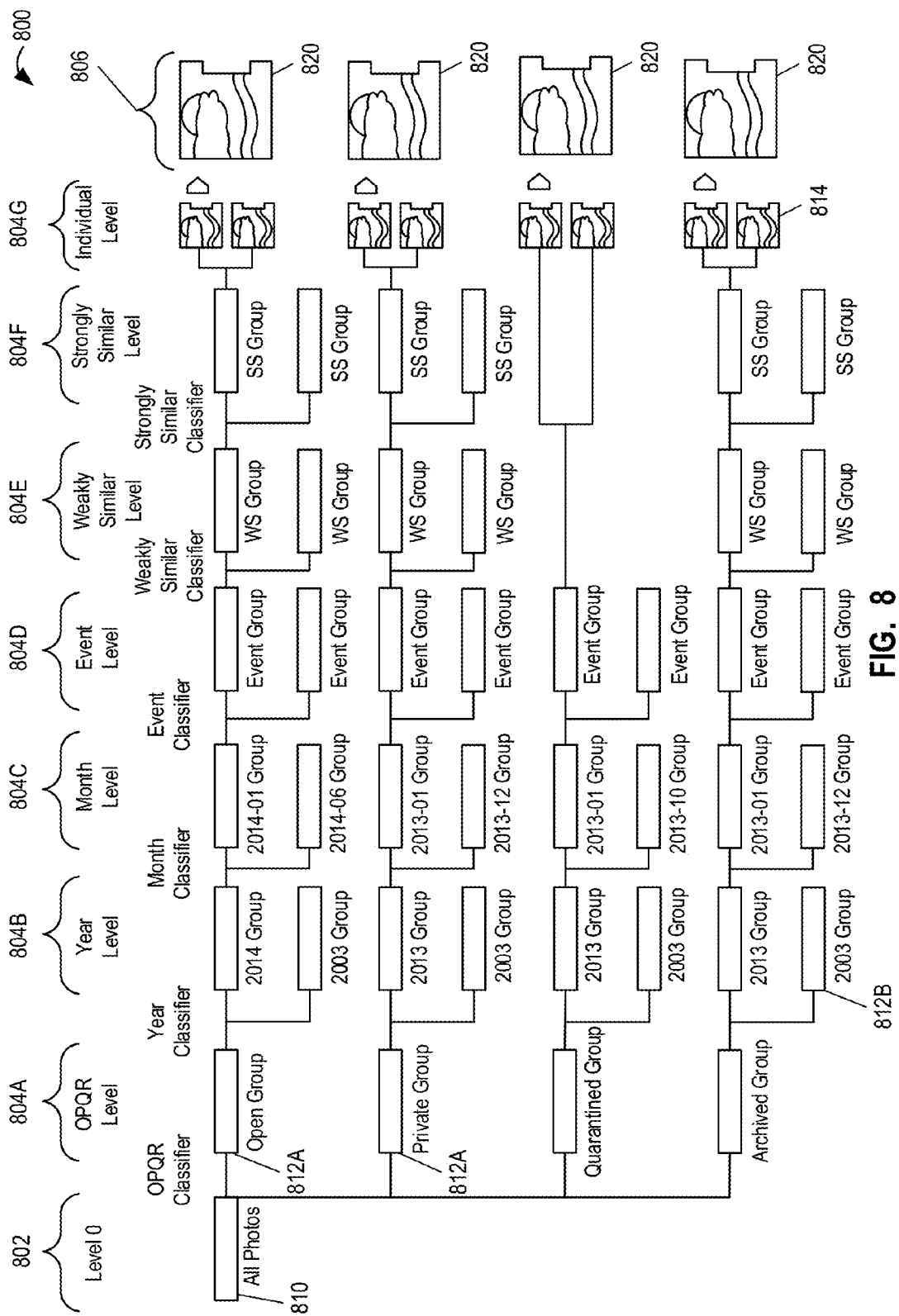
FIG. 8 shows a block diagram of an example hierarchical structure that can be used by the system of FIG. 1 to organize images in accordance with an embodiment.

Referring now to FIG. 8, shown therein is an example of a hierarchical group structure 800. The hierarchical group structure 800 has, in addition to the top group level 810 (i.e. the entire set of images), bottom subgroup level 806 (including individual images 820 at full resolution), and second bottom subgroup level 804G (downsampled images 814 of each image), six (6) additional subgroup levels 804 in between: OPQR subgroup level 804A, Year subgroup level 804B, Month subgroup level 804C, Event subgroup level 804D, Weakly Similar subgroup level 804E, and Strongly Similar subgroup level 804F.

In general, the hierarchical order of subgroup levels 804A-804G can be interchangeable. In some embodiments, however, the OPQR subgroup level 804A may be positioned as a second top group level, and then the hierarchical order of subgroup levels 804B-804G can be interchangeable therebelow. This may be used, for example, to separate images having quarantined or private access levels from other images when a user is navigating the plurality of images.

At 330, a plurality of display groups can be determined as a subset of groups from the plurality of groups of images. The plurality of display groups may be determined based on input received from a user. In some cases, the plurality of display groups may be determined based on input received from the user interacting with a graphical user interface displayed to the user on the computing device display.

Figure 9:
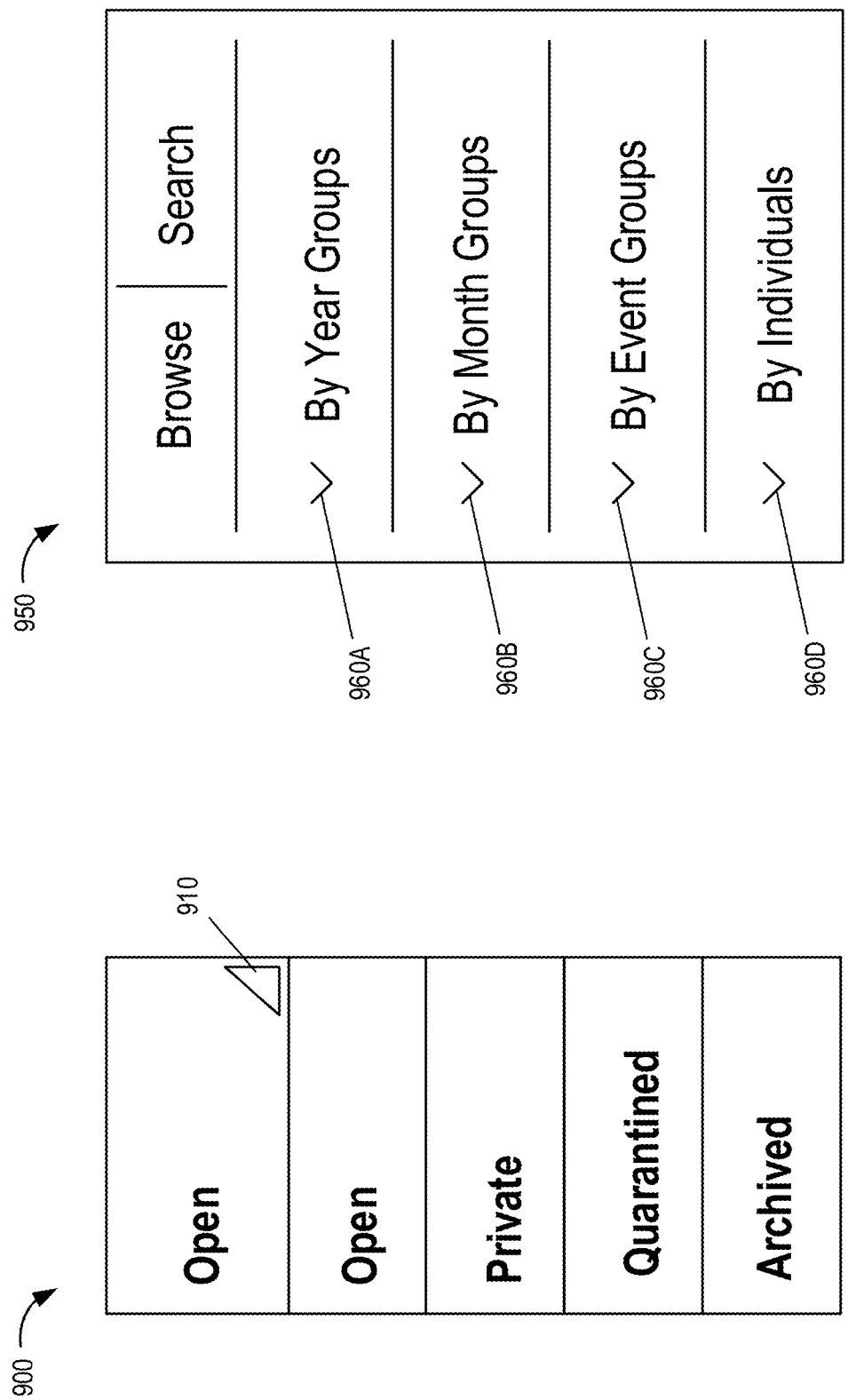
FIG. 9A shows an example of a user interface that may be displayed to a user in an embodiment of the system of FIG. 1.
FIG. 9B shows an example of another user interface that may be displayed to a user in an embodiment of the system of FIG. 1.
Figure 10:
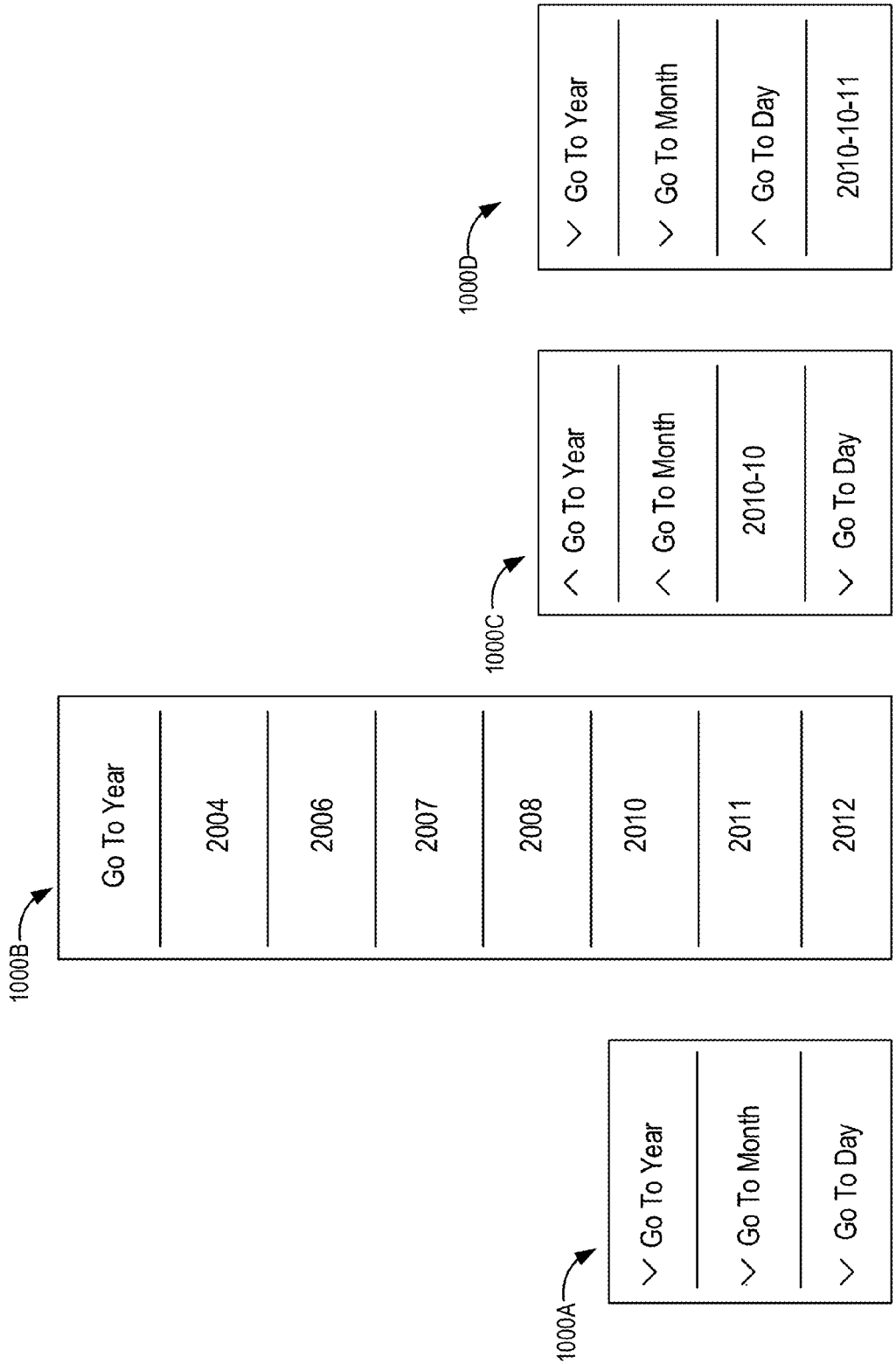
FIG. 10A shows another example of a user interface that may be displayed to a user in an embodiment of the system of FIG. 1.
FIG. 10B shows an example of another user interface that may be displayed to a user in an embodiment of the system of FIG. 1.
FIG. 10C shows an example of another user interface that may be displayed to a user in an embodiment of the system of FIG. 1.
FIG. 10D shows an example of a further user interface that may be displayed to a user interacting with the system of FIG. 1.

Referring now to FIG. 9A, shown therein is an example of a graphical user interface 900 for selecting one of the O, P, Q, and R Groups using a dropdown menu. The top portion of GUI 900 a button 910 with the text shown to be one of Open/Private/Quarantined/Archived appears, indicating which of O, P, Q, and R Groups has been selected. In the example shown in GUI 900, the Open group has been selected. When a user clicks or taps the button 910 in GUI 900, it expands to show a list of Open, Private, Quarantined, and Archived groups. When a particular group on the list is selected by a user, the system can display representative images for subgroups below that particular group. For example, in the hierarchical structure of FIG. 8, when a particular access level group 812A is selected, representative images of all the year subgroups 812B for the selected display group may be displayed. The GUI 900 may then return to a button 910 indicating which of the O, P, Q, and R Groups are currently selected.

Referring now to FIG. 9B, shown therein is an example GUI 950 that may be displayed to a user to allow the user to explore images across various subgroup levels. GUI 950 includes a list of buttons 960, showing four options: "Browse by Year Groups" 960A, "Browse by Month Groups" 960B, "Browse by Event Groups" 960C, and "Browse by Individuals" 960D. When an input is received from the user indicating the selection of a particular button 960 (e.g. by a user clicking or tapping one of the buttons 960), the representative images for all subgroups at that particular subgroup level can be displayed.

In some embodiments, if each subgroup at the selected subgroup level includes only one image, the image icons can be grouped into subgroups sharing some common allocation criteria such as metadata and/or derived pixel content attributes. Each subgroup can then be marked by the common attributes using a subgroup criteria marker. Since at a low group level there may be many subgroups whose icons would be displayed in a scrollable view, a navigation panel may be provided to help users locate a set of subgroups of interest at that low subgroup level. The navigation panel may list a set of allocation criteria, (e.g. metadata and/or derived pixel content attributes) each associated with a set of subgroup icons at that low level. Once a low level and a particular allocation criterion underneath it are selected, the system can automatically display subgroups having the desired allocation criteria.

Referring now to FIGS. 10A-10D, shown therein is a GUI with an example navigation panel 1000. Navigation panel 1000 is a two-level expandable list, initially showing GoTo Year, GoTo Month, and GoTo Day options (navigation panel 1000A). When GoTo Year is selected, all the year groups having at least one image allocated thereto can be shown for the user to further select (navigation panel 1000B). In some embodiments, such as embodiments using the hierarchical structure shown in FIG. 8 above, the navigation panel may only show subgroups for a particular access level selected.

When a year group on the list of year groups is selected, the list of year groups can collapse, while the list of month subgroups in the selected year group having at least one image assigned thereto, can be shown for the user to select (navigation panel 1000C). Further, when a month subgroup is selected, the list of month subgroups can collapse, while the list of day subgroups in the selected month subgroup of the selected year group having at least one image allocated thereto can be shown for the user to select (navigation panel 1000D).

Alternatively, if GoTo Month is selected directly from the navigation panel 1000A without selecting any year group, the list of all month groups having at least one image allocated thereto, can be shown for the user to select. Likewise, if GoTo Day is selected directly from the navigation panel without selecting any year group or month group, the list of day groups having at least one image allocated thereto can be shown. Furthermore, for each selected year group, month group, or day group from the navigation panel, the set of representative images for the selected year group, month group, or day group can be displayed on the computing device display. In addition, in some embodiments the navigation panel may automatically disappear after a day group is selected.

In some embodiments, since groups at any level of the hierarchical structure other than the top one or two levels can be formed automatically (in some cases the access levels may not be defined automatically, however default access levels may be used where a user has not yet specified the access level for a particular image), the system may also enable one click (or one tap) group selection for group sharing and/or group tagging. In addition, the same hierarchical structure and display procedure can also be applied to display, visualize, and manage a subset of images which share some common metadata and/or derived pixel content attributes and may be selected via a search panel.

In some embodiments, where a user selects a particular group, the sub-groups of that group to be displayed to the user may be determined taking into account the size of the computing device display. This may facilitate the user's navigation through the various group levels without requiring the user to sort through a large number of image folders at each level, or having to "click-through" multiple subgroup levels with only one folder. An example process for determining a plurality of display groups will be described in further detail below with reference to FIG. 7.

At 340, a plurality of representative images can be determined by, for each display group in the plurality of display groups, determining a representative image for representing all of the images in that display group. The representative image for a particular display group can be determined in various ways.

In some embodiments, the representative image may be determined by selecting one or more images from the display group and including at least a portion of each of the selected images in the representative image. These selected images may be referred to as representative group images.

For example, at least one display group may include a number of images greater than a threshold number of images (in general, the threshold number of images can be an integer greater than 1). The representative image can be determined for each of those display groups by selecting a subset of representative group images that includes at least two of the images in that display group. The representative image can then be generated to include at least a portion of each representative group image in the selected subset of representative group images.

The representative image may take various forms, such as a single image or a mosaic image based on the images allocated to that display group. In some cases, perspective projections can be used to generate the representative image. An example embodiment using perspective projections will be described in further detail below with reference to FIG. 6.

In some embodiments, the representative image for a display group can include a plurality of representative image portions, and each representative image portion can be determined based on one of the subgroups of that particular display group. In some embodiments, the set of all representative image portions for the group can reflect the pixel contents of all images within the group. In some cases, for a similar image subgroup within the group (i.e. for a set of images allocated to that group which look similar to each other), a small number of them may be selected as representative subgroup images for that similar image subgroup. In some embodiments, the representative image portions may include an image portion with a subgroup representative image for each similar image subgroup within that group. The subgroup representative image for a similar image group may represent all of the images within that similar image group, and may include at least a portion of one or more representative subgroup images for that similar image group.

In some embodiments, depending on whether a group is defined based on derived pixel content attributes of images allocated to that group or based on metadata attributes of images allocated to that group, the representative image for the group may be determined in different manners.

In some embodiments, the representative image for each display group can be determined based on the display size of the computing device being used. A maximum representative image size can be determined for each display group based on an allocated display size of the computer device display for all of the display groups to be displayed. The representative image for each display group can then be determined to have a representative image size no greater than the maximum representative image size for that display group.

The maximum representative image size for a display group may be determined by identifying an allocated display size of the computer device display for the plurality of display groups. The allocated display size can then be divided into a plurality of display group portions, with one display group portion for each display group in the plurality of display groups. The maximum representative image size for each display group can be determined as the size of the display group portion for that display group.

At 350, the plurality of representative images determined for the display groups can be concurrently displayed on the computer device display. Example user interfaces displaying a plurality of representative images will be described in further detail with reference to FIGS. 13A and 13B below.

In some embodiments, the representative image for a display group can be generated to have a total image size greater than the maximum representative image size for that display group. In such cases, the representative image for that display group may be displayed by displaying a portion of the representative image on the computing device display at any one time. The displayed portion of the representative image can have a portion size no greater than the maximum representative image size.

In some embodiments, the representative image for a particular display group can be displayed by successively displaying each portion of the representative image for the particular display group. In some embodiments, the representative image may be displayed as an animated or scrolling representative image that displays each portion of the representative image over time. An example of an animated representative image is described in further detail below with reference to FIGS. 12A-12D.

An animated representative image may provide a user with further information regarding the images contained within a particular display group, even where the allocated screen size for the representative image is small. In some embodiments, the animated representative image may be static until an animation input is received from a user. For example, the animation input may be the user clicking or tapping an animation marker or hovering a cursor over the representative image.

For simplicity, the method 300 has been described in conjunction with its performance by a computing device 102. However, it will be apparent that various aspects of method 300 may be performed by other components of system 100, such as the server 104. For example, in some embodiments the computing device 102 may provide visualization and user interface aspects of method 300, while the server 104 may analyze the plurality of images, determine image allocation criteria, and allocate images to a plurality of image groups.

For example, in some embodiments with images having R-image access level, the image allocation criteria for each image (e.g. the image-specific allocation criteria such as the derived pixel content attributes, and the metadata attributes) can be determined by the server 104 and provided to the computing device 102. In some cases, the server may allocate the images to groups, while in other cases the computing device 102 may use the image allocation criteria provided by the server 104 to allocate images to groups of images.

Figure 4:
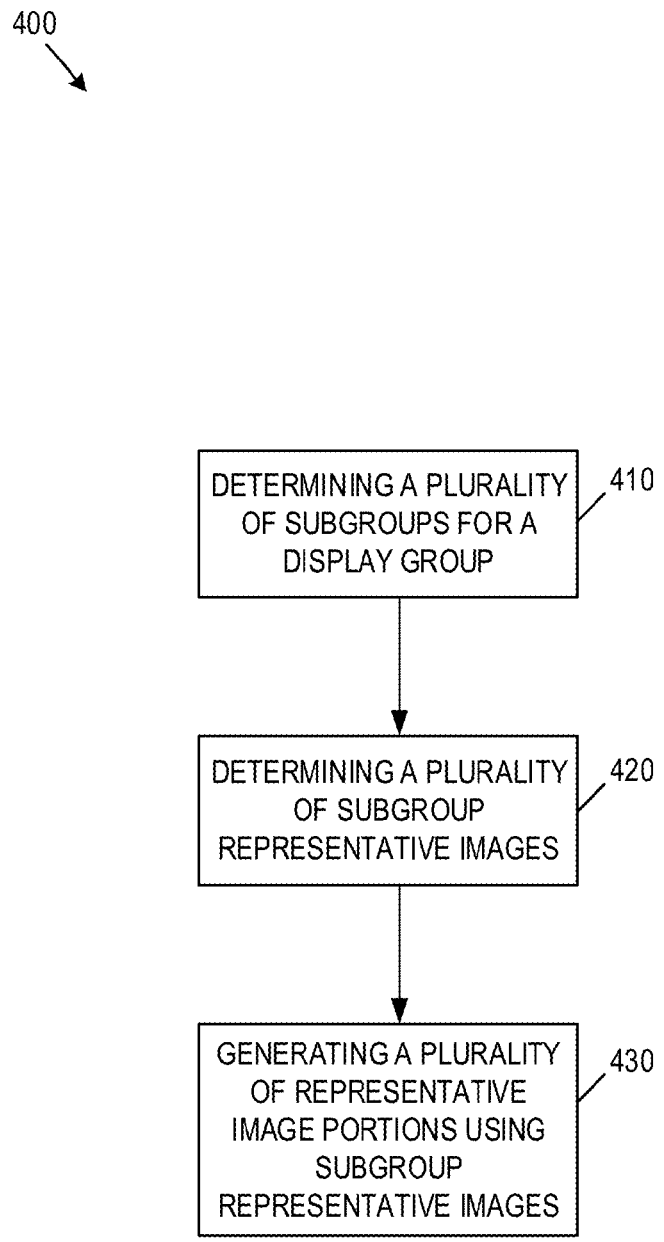
FIG. 4 shows a flowchart of an example embodiment of a method for determining a representative image that may be used with an embodiment of the method for organizing images of FIG. 3.

Referring now to FIG. 4, shown therein is an example process 400 for determining a representative image for a display group. In some embodiments, process 400 may be used at 340 of method 300 for organizing a plurality of images. In general, process 400 can be used for at least one display group in a plurality of display groups, where that display group includes a number of images greater than a threshold number of images, the threshold number of images being an integer greater than 1.

At 410, a plurality of subgroups of images can be determined for the display group. Each image in the display group can be allocated to one of the subgroups of images. For example, where the display group is a year group, the subgroups of images may be determined for that year group as a plurality of month subgroups. The plurality of month subgroups may correspond to each month of that year in which an image was captured. Alternatively, the subgroups may be determined as a plurality of similar image groups, with images grouped based on image-specific allocation criteria derived from the pixel content of the images.

In some embodiments, the plurality of subgroups of images may include a first similar image group from the plurality of similar image groups. The first similar image group can include a plurality of first similar images, with each first similar image having a similarity distance between that first similar image and at least one of the other first similar images within a similarity threshold range. The first similar image group may be an example of a WS group or SS group as mentioned above.

In some embodiments, the plurality of subgroups of images may further include at least one additional similar image group from the plurality of similar image groups. Each additional similar image group can include a plurality of additional similar images. For each additional similar image group, each additional similar image in that additional similar image group can have a similarity distance between that additional similar image and at least one of the other additional similar images in that additional similar image group within the similarity threshold range for that additional similar image group. In general, the plurality of first similar images and each plurality of additional similar images can be disjoint and each plurality of additional similar images can be disjoint from every other plurality of additional similar images.

At 420, a plurality of subgroup representative images can be determined for a display group by, for each subgroup in that display group, determining a subgroup representative image representing all of the images in that subgroup. In general, a subgroup representative image may be determined in the same manner as a representative image for a display group. A plurality of subgroup representative images can then be determined with one subgroup representative image for each subgroup of images in the plurality of subgroups of images determined at 410.

In some embodiments, the subgroup representative image can be determined for a first similar image group by selecting a plurality of representative first similar images from the plurality of first similar images. The subgroup representative image for the first similar image group can then be generated to include at least a portion of each representative first similar image in the plurality of representative first similar images. For example, the subgroup representative image can be generated by partially overlapping each of the representative first similar images.

Similarly, for each additional similar image group, the subgroup representative image can be determined by selecting a plurality of representative additional similar images from the plurality of additional similar images in that additional similar image group. The subgroup representative image can be generated for the additional similar image group to include at least a portion of each representative additional similar image in the plurality of representative additional similar images.

At 430, the representative image for a display group can be determined by generating a plurality of representative image portions. Each representative image portion can include the subgroup representative image for one of the subgroups of images in the plurality of subgroups of images. An example of a representative image having a plurality of representative image portions will be described in further detail below with reference to FIG. 11.

For example, if a display group is a year group, a month group, or an event group, the display group may be decomposed into a plurality of disjoint similar image groups (i.e. disjoint WS groups and disjoint SS Groups). Each disjoint similar image group can be an intersection of the display group with a similar image group defined according to a pixel content similarity distance. Furthermore, where the display group is a weakly similar image group, that display group may be further decomposed into a plurality of disjoint strongly similar image groups. The strongly similar image groups may having similarity threshold ranges indicating a closer similarity between images within those groups, than the similarity threshold ranges for weakly similar image groups.

In some embodiments, the representative image for a display group can include up to a fixed number of representative subgroup images (such as 2 images) from each disjoint similar image subgroup in the respective decomposition no matter how many images a particular disjoint similar image group contains. The representative image for the display group can be determined to include representative subgroup images from the same disjoint similar image group partially overlapped (i.e., the subgroup representative image for that similar image group includes the representative subgroup images for that similar image group partially overlapped), while representative subgroup images from different similar image groups are not overlapped with each other.

Figure 11:
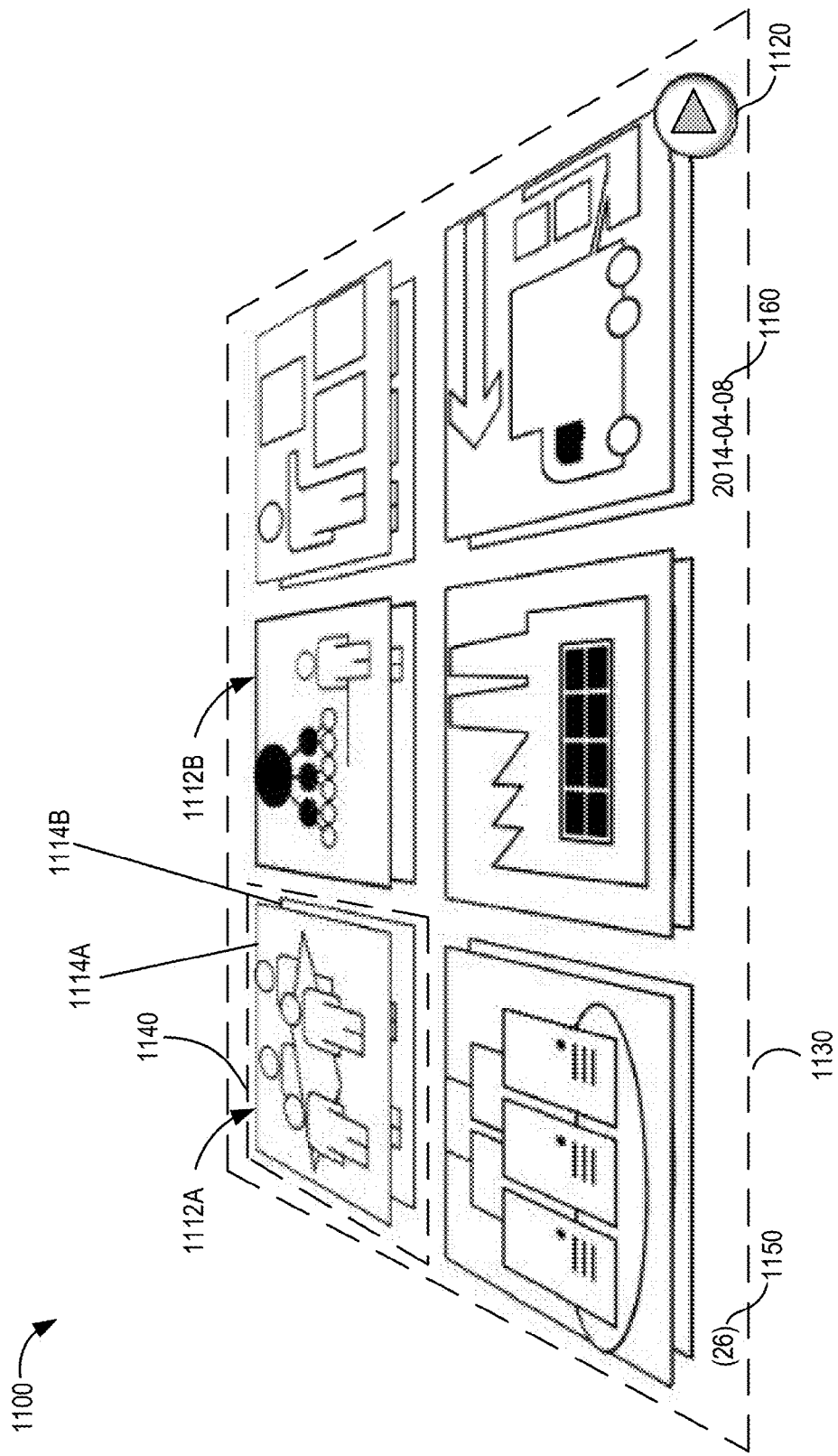
FIG. 11 shows an example of a user interface with a representative image including a plurality of subgroup representative images that may be displayed to a user in an embodiment of the system of FIG. 1.

FIG. 11 shows an example of a representative image 1100 for a display group. The representative image 1100 is displayed within an allocated display space 1130 determined for that display group. The allocated display space 1130 can be used to determine a maximum representative image size for the representative image 1100. In some cases, depending on the display screen size and resolution of a device, the actual look of the same representative image 1100 may change from one device to another.

The representative image 1100 includes a plurality of subgroup representative images 1112. The allocated display space 1130 is divided into the plurality of representative image portions 1140, with one image portion for each subgroup representative image 1112. In representative image 1100, each subgroup representative image 1112 corresponds to a similar image subgroup. Accordingly, the representative similar images (e.g. representative subgroup images 1114A and 1114B in subgroup representative image 1112A) in each subgroup representative image 1112 are partially overlapped.

FIG. 11 shows a perspective projection of the representative similar images for each subgroup representative image 1112. In FIG. 11, representative similar images are placed underneath each other in the 3D scene so that after being projected to a 2D screen, they appear partially overlapped. Dissimilar-looking images (i.e. images from different similar image subgroups) are projected and displayed without overlapping with each other.

The representative image 1100 also includes an allocation criteria marker 1160. The allocation criteria marker 1160 indicates the allocation criteria common to the images allocated to this display group. In this case, the representative image 1100 represents a display group of images having metadata indicating they were captured on Apr. 8, 2014. The representative image 1100 also includes an image number marker 1150 indicating how many images are allocated to this display group.

In some embodiments, the representative image for a display group may include at least one image from each disjoint similar image group in the decomposition of the display group. The actual number of representative subgroup images selected for each disjoint similar image group may be dynamically determined based on the number of disjoint similar image groups and the number of images within that disjoint similar image group. Algorithm 1 shows an example process for determining the number of representative subgroup images for each disjoint similar image group.

Example Algorithm 1—Determining the Number of Representative Subgroup Images

Assume the display group includes K similar image subgroups. Let $N[i]$ be the number of images in similar image subgroup i, $1 \leq i \leq K$. Given a threshold T on the number of representative group images for the display group, the following algorithm can determine the number $S[i]$ of images in the similar image subgroup i to be selected as representative subgroup images for the similar image subgroup i, $1 \leq i \leq K$.

Algorithm 1:

If $K \geq T$
  $S[i] = 1$ for $1 \leq i \leq K$
else if $\Sigma_{i=1}^{K} N(i) \leq T$
  $S[i] = N[i]$ for $1 \leq i \leq K$
else
  $$S[i] = \left\lceil \frac{N[i]}{\sum_{i=1}^{K} N[i]} \times T \right\rceil \text{ for } 1 \leq i \leq K$$

Here [•] is the ceiling function that rounds up a fraction number to its nearest integer on the right. In some embodiments, Algorithm 1 may be used where the display group is a weakly similar image group and the K similar image subgroups are disjoint strongly similar image subgroups.

If the display group is a strongly similar image group, images within the display group look strongly similar to each other. To generate the representative image, a selection of images from the group can be resized and at least a portion of each selected image can be displayed. If the display group includes an individual image, the representative image can be determined as a version of the image itself resized to fit into the display screen space allocated to that group.

As mentioned above, if the representative image has a representative image size greater than the allocated screen size for that display group then a portion of the representative image can be displayed at any one time. In some cases, an animated representative image can be used to display all the subgroup representative images for that display group over time.

Referring again to FIG. 11, the representative image 1100 shown therein has a total image size greater than the maximum representative image size determined based on the allocated display size 1130. Accordingly, the representative image 1100 includes an animation button 1120 that allows a user to initiate animation of the representative image 1100.

FIG. 12A to FIG. 12D show example screen shots of an animated representative image corresponding to the representative image 1100 shown in FIG. 11. In this case, when a user selects the animation button 1120 a larger pop-up window is initiated to display the animated representative image with a size larger than the maximum representative image size 1130.

As the animation begins, the animated representative image 1200A displayed by the perspective projection start to crawl towards the bottom of the pop-up window. The bottom row 1212A of representative subgroup images (hereafter may be referred to as the first bottom row) starts to disappear when it reaches the bottom of the pop-up window. In FIG. 12C, a new row 1212B of representative subgroup images (initially not shown in the representative icon) crawls into the boundary of the representative image 1200C in the pop-up window from the top. After certain time of playing, the first bottom row 1212A totally disappears while the new row 1212B is completely displayed at the top of the pop-up window. In some examples, the animation can play all rows of representative subgroup images cyclically; when the first bottom row 1212A appears for the first time on the top of the pop-up window, a full cycle has been played.

Figure 12A:
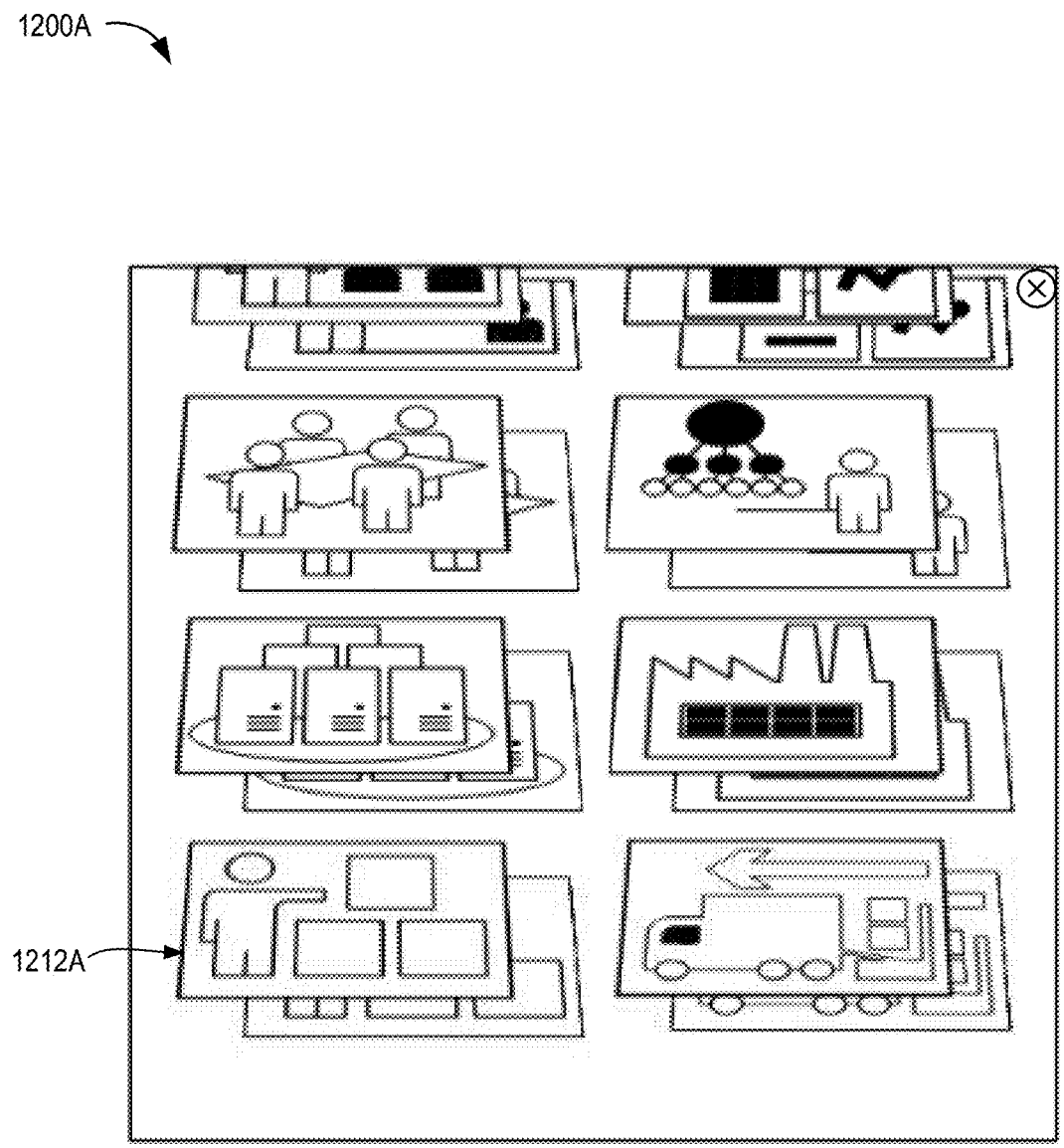
FIG. 12A shows an example of another user interface with a representative image including a plurality of subgroup representative images that may be displayed to a user in an embodiment of the system of FIG. 1.
Figure 12B:
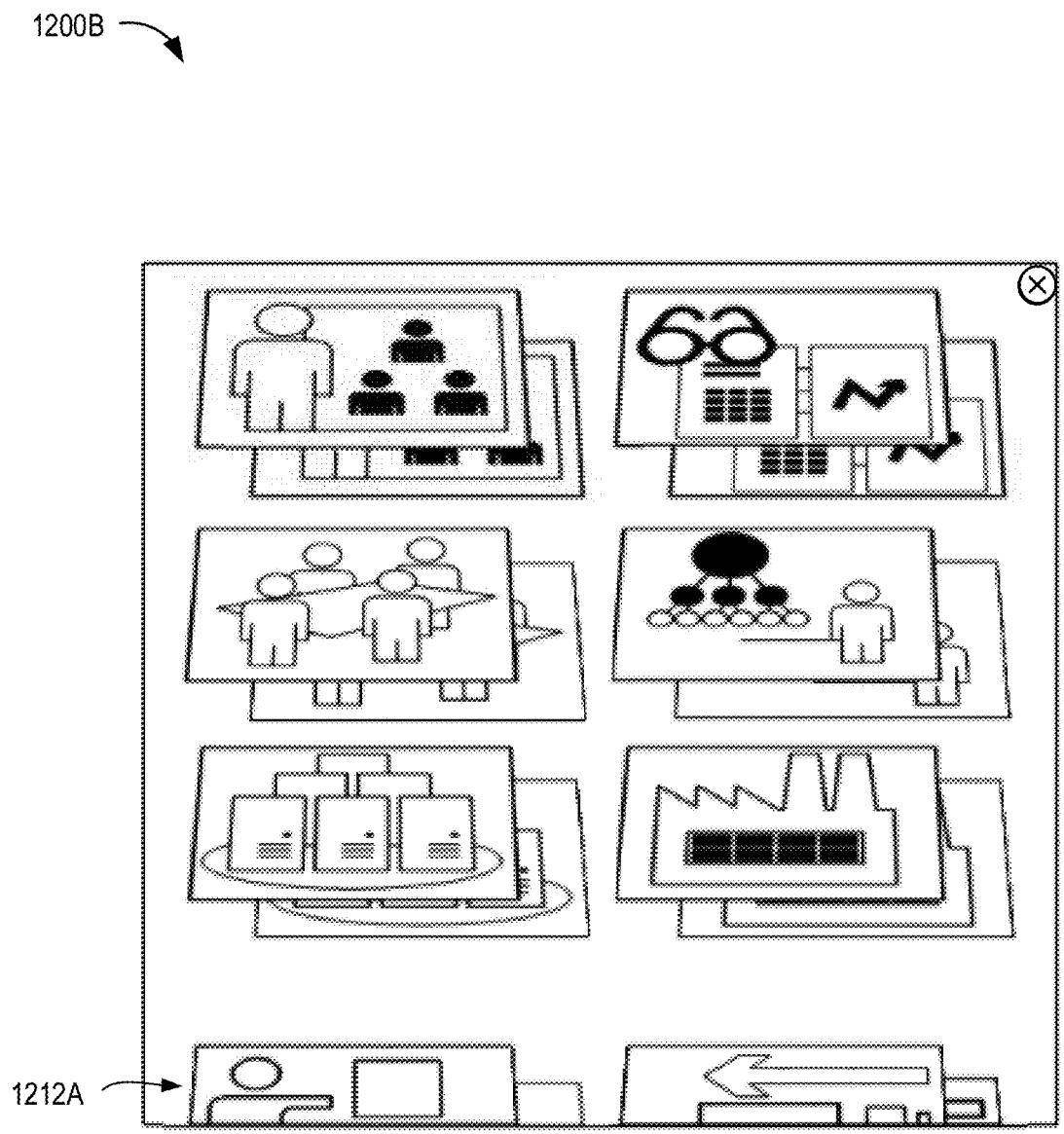
FIG. 12B shows another example of the user interface of FIG. 12A.
Figure 12C:
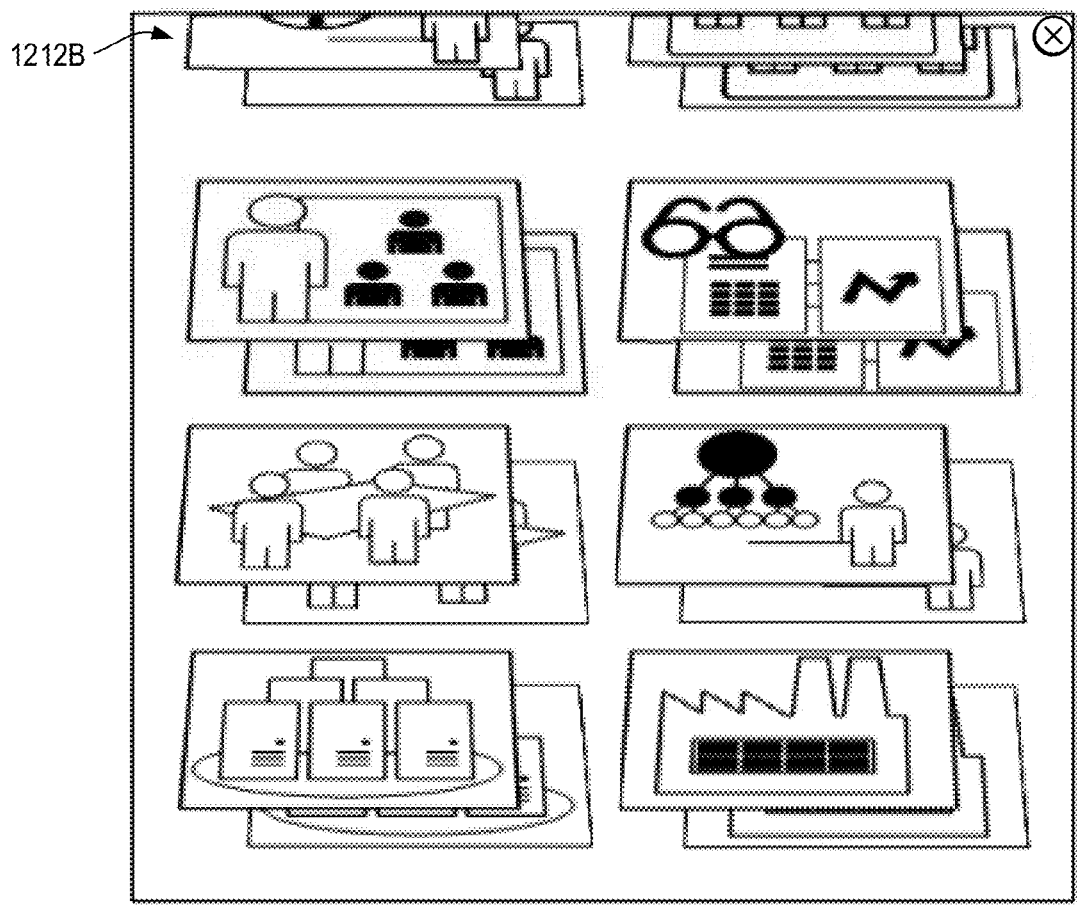
FIG. 12C shows another example of the user interface of FIG. 12A.
Figure 12D:
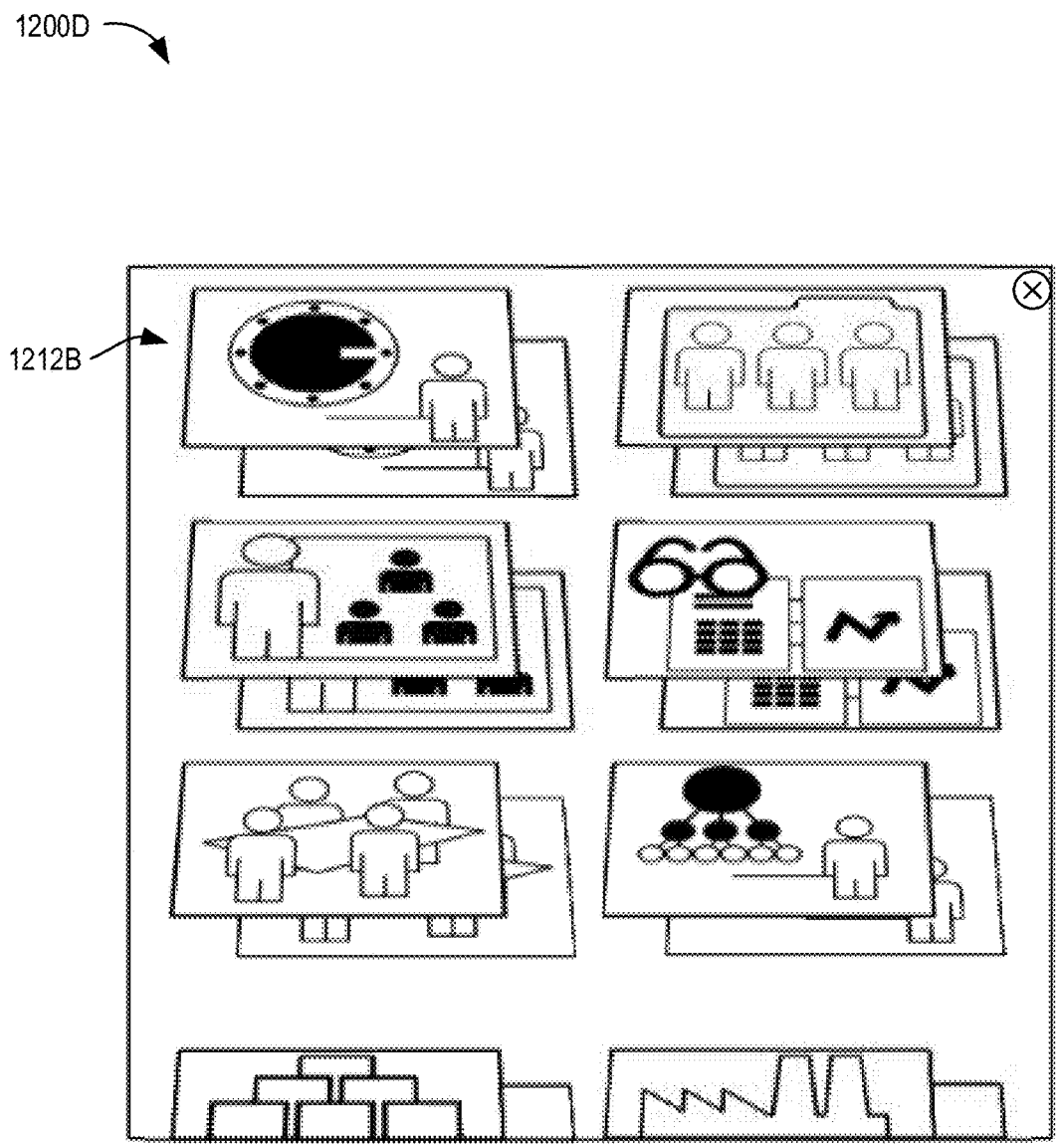
FIG. 12D shows a further example of the user interface of FIG. 12A.

While the animation in FIGS. 12A-12C are described in the context of a pop-up window, the animation may also occur in the same display space as representative image 1100 with the maximum representative image size 1130. As well, the animation may be initiated in other ways, such as by hovering a cursor over the representative image 1100 for example.

Figure 5:
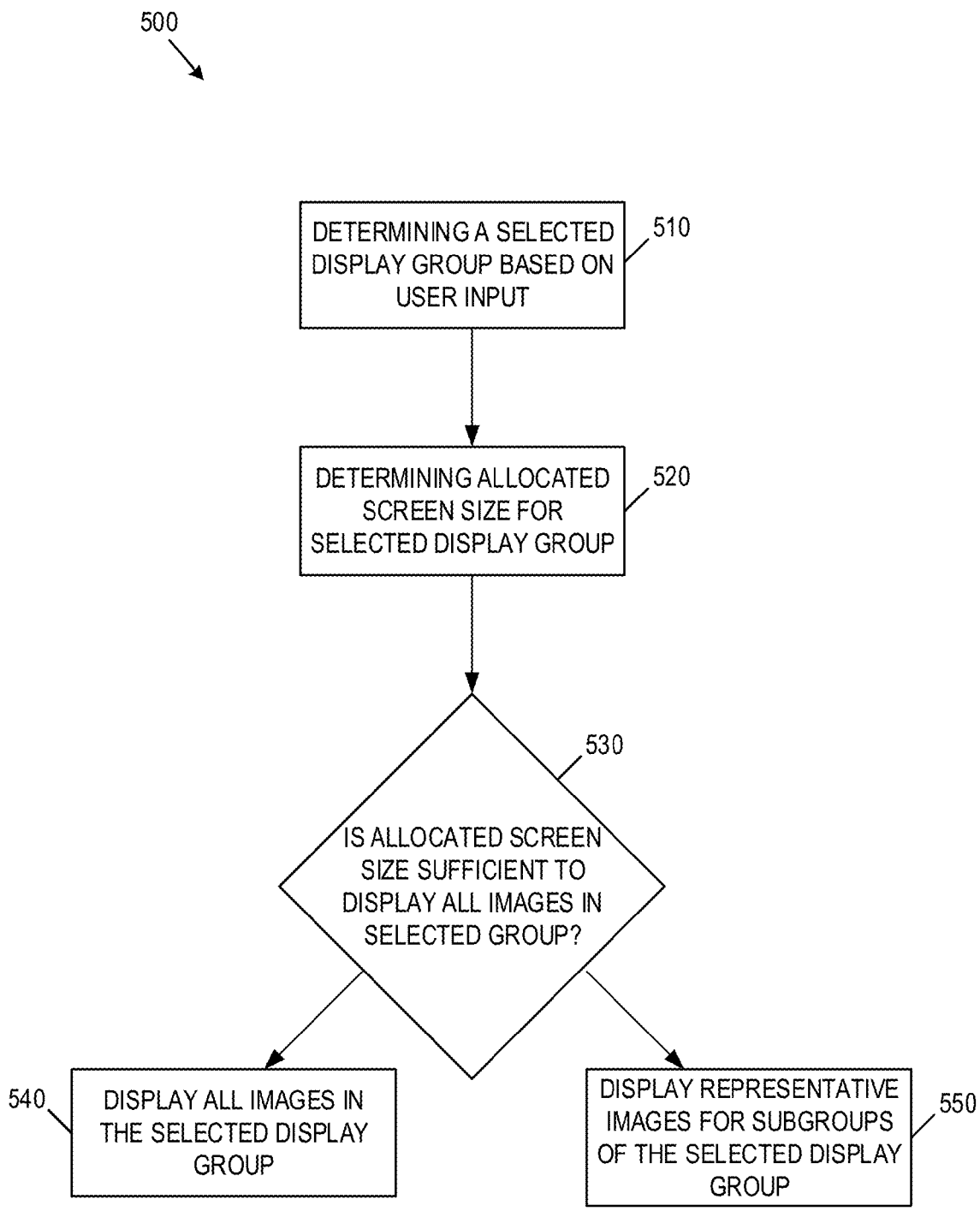
FIG. 5 shows a flowchart of an example embodiment of a method for determining whether to display images or representative images of subgroups that may be used with an embodiment of the method for organizing images of FIG. 3.

Referring now to FIG. 5, shown therein is an example of a method 500 that can be used to determine whether to display images or representative images of subgroups on the computing device display. In general, method 500 may be used when the representative images for a plurality of display groups are being displayed to a user. When a particular display group is selected by the user, method 500 may determine whether all the images (or downsampled versions of the images) allocated to that group should be displayed, or whether representative images for subgroups of that display groups should be shown to a user.

At 510, a selected display group can be determined based on an input received from a user. A user interface can be provided in association with the computer device display for receiving an input from a user. An input can be received from the user, and a selected representative image can be determined based on the input. For example, the input may be a click or tap of a particular representative image.

In general, the selected representative image can be the representative image for a selected display group from the plurality of display groups. If the selected display group contains only a single image, or less than a threshold number of images then all the images may be displayed without proceeding through the remainder of method 500. Where the selected display group includes a number of images greater than the threshold number of images (e.g. an integer greater than 1), method 500 may proceed to 520.

At 520, an allocated screen size of the computer device display for the selected display group can be determined. For each display group at any level, certain display screen space may be allocated to that display group it is displayed on the device. The display space allocated to a particular display group may depend on the number of display groups at that subgroup level and/or the size of the device display.

At 530, the computing device may determine if the allocated screen size of the computer device display is sufficient to concurrently display the number of images in the selected display group. For example, the computing device may automatically determine the maximum number of images that the allocated display screen space can display at any instant (may be referred to as a concurrent display threshold). Then, the computing device can determine if the number of images allocated to the selected display group is greater than the concurrent display threshold.

At 540, if the allocated screen size of the computer device display is sufficient (i.e. the number of images allocated to the selected display group is less than or equal to the concurrent display threshold) then the images in the selected display group (or downsampled versions thereof) can be concurrently displayed on the computer device display.

At 550, if the allocated screen size of the computer device display is not sufficient (i.e. the number of images allocated to the selected display group is greater than the concurrent display threshold), then representative images can be displayed for subgroups of the selected display group.

The computing device may determine a plurality of subgroups of images for the selected display group, where each image in the selected display group is allocated to one of the subgroups of images. A plurality of representative images can then be determined for the selected display group by, for each subgroup in the selected display group, determining a representative image for that subgroup representing all of the images in that subgroup. The plurality of representative images for the 740 plurality of subgroups of images determined for the selected display group can then be displayed on the computer device display.

In some embodiments, representative group images for a display group can be resized and then displayed using a perspective projection. In some cases, the perspective projection can be generated so that similar-looking representative group images (e.g. a set of images from a similar image subgroup) are partially overlapped and dissimilar-looking representative group images (i.e. the sets of images from different disjoint similar image subgroups) are not overlapped with each other.

In some cases, the display screen space allocated to the display group may still not be sufficient to display all the representative group images all at once even using a perspective projection. In such cases, display time may be traded off for display space by animating the representative group images when displayed.

Figure 6:
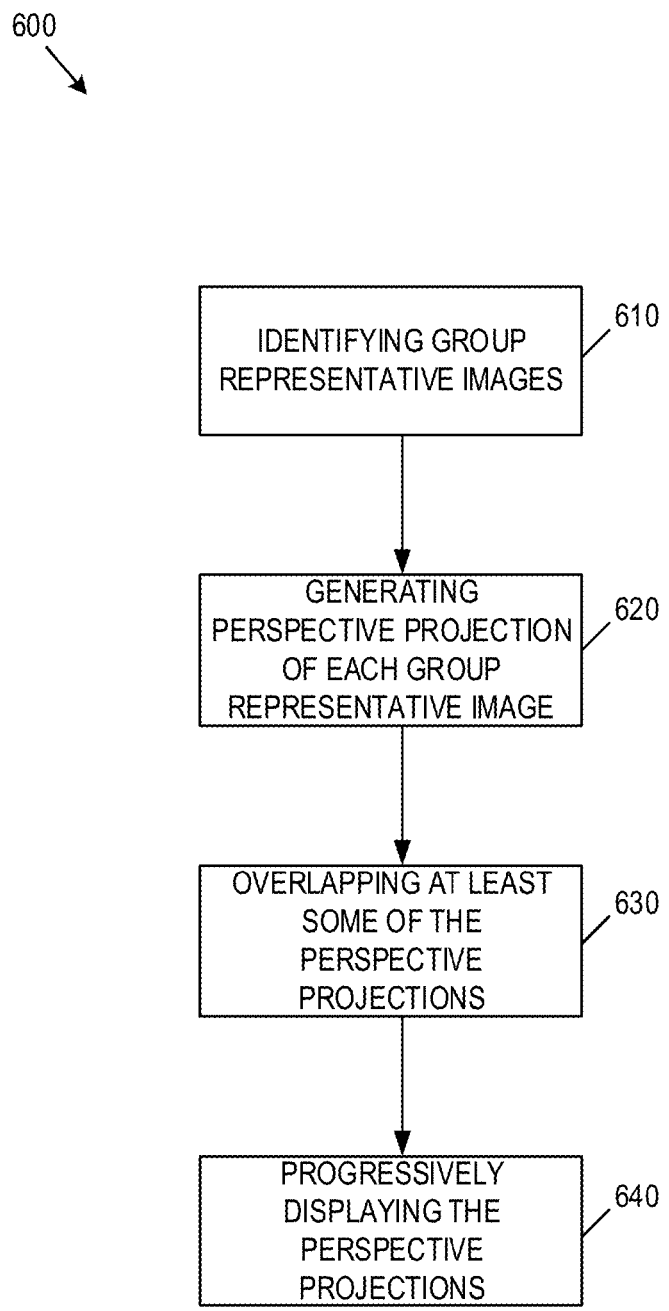
FIG. 6 shows a flowchart of an example embodiment of a method for determining and displaying a representative image that may be used with an embodiment of the method for organizing images of FIG. 3.

Referring now to FIG. 6, shown therein is an example process 600 for generating a representative image for a display group. As mentioned above, the representative image for a display group can be determined by selecting a subset of representative group images that includes at least two of the images in that display group.

At 610, the representative group images can be determined for the display group. For example, the representative group images can be a subset of the images allocated to that group. In some cases, as mentioned above, the representative group images may include a plurality of representative subgroup images.

At 620, a perspective projection of each representative group image can be generated. A perspective projection can be generated for each representative group image in the selected subset of representative group images.

The perspective projection may be generated to display at least a portion of multiple representative group images within an allocated display size that may otherwise be insufficient to display those representative group images concurrently.

A perspective projection may be considered a mapping from points in a 3D space to points in a 2D space, represented by a 4×4 matrix M. Specifically, let $$\begin{bmatrix} a_x \\ a_y \\ a_z \end{bmatrix}$$

represent a point in a 3D space with coordinates x, y, and z. Then, the point $$\begin{bmatrix} a_x \\ a_y \\ a_z \end{bmatrix}$$

can be mapped by a perspective projection M to a point $$\begin{bmatrix} b_u \\ b_v \end{bmatrix}$$

in a 2D space with coordinates u and v, where $$\begin{bmatrix} f_x \\ f_y \\ f_z \\ f_w \end{bmatrix} = M \begin{bmatrix} a_x \\ a_y \\ a_z \\ 1 \end{bmatrix},$$

$$b_u = \frac{f_x}{f_w}$$

and $$b_v = \frac{f_y}{f_w}.$$

A 3D scene can then be projected into a 2D view by a perspective projection. In the perspective projection, the pixel at point $$\begin{bmatrix} b_u \\ b_v \end{bmatrix}$$

in the 2D view can be a composition of the pixels of all points $$\begin{bmatrix} a_x \\ a_y \\ a_z \end{bmatrix}$$

in the 3D scene that are mapped to $$\begin{bmatrix} b_u \\ b_v \end{bmatrix}$$

by the perspective projection. The blending of pixels from the 3D scene that are mapped into the same point in the 2D scene can depend on whether objects represented by pixels at those points in the 3D scene are opaque, translucent, or transparent.

Figures 13A, 13B:
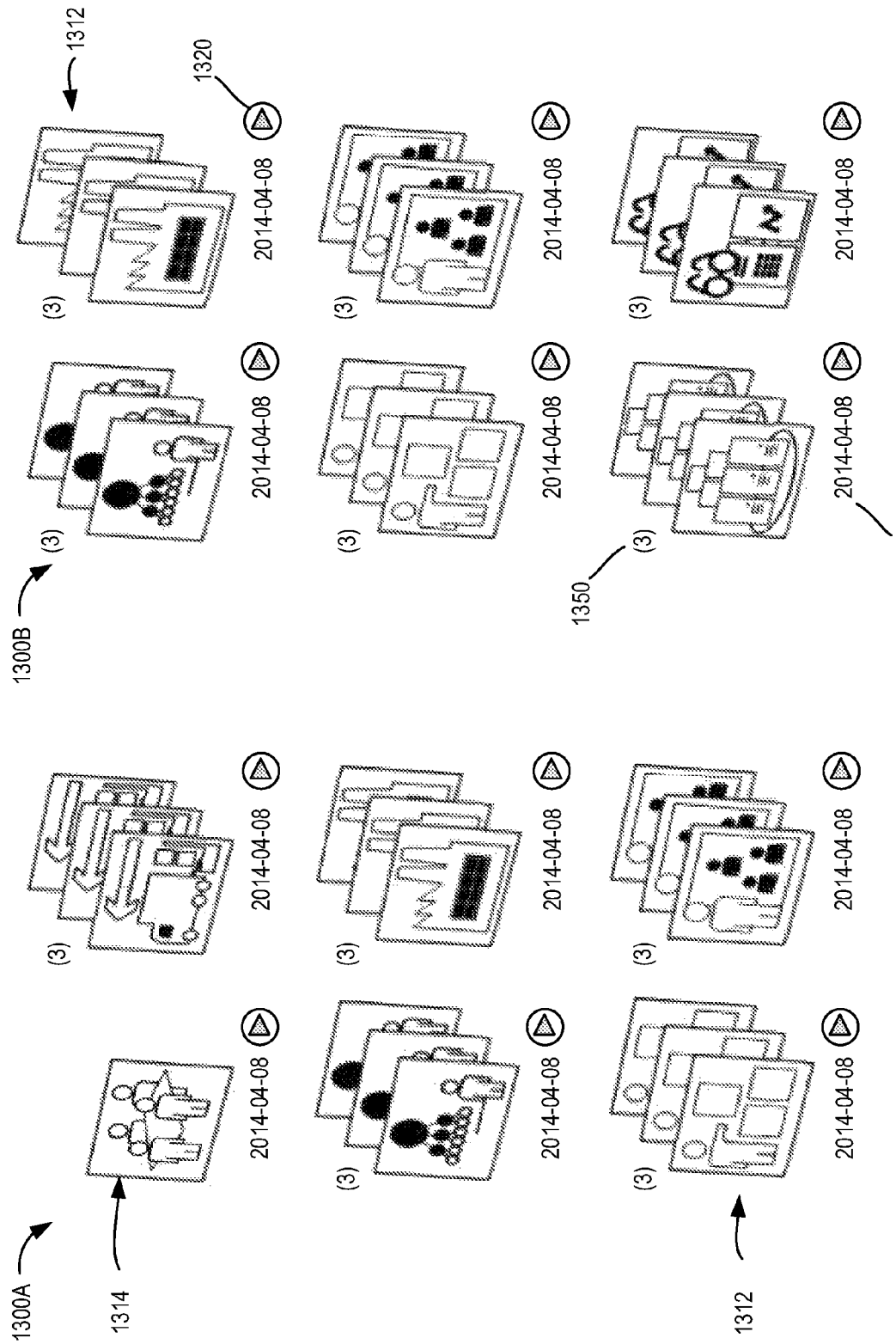
FIG. 13A shows another example of a further user interface with a plurality of representative images that may be displayed to a user in an embodiment of the system of FIG. 1.
FIG. 13B shows another example of the user interface of FIG. 13A.

Referring now to FIGS. 13A and 13B, shown therein are example screenshots 1300A and 1300B of a plurality of representative images 1312 being displayed to a user. The representative images 1312 may be representative images determined for subgroups at the next display subgroup level of the display group corresponding to the representative image 1100 shown in FIG. 11. One display subgroup includes only a single image and as a result an image icon 1314 is displayed as the representative image for that display subgroup. After the representative image 1100 is selected (e.g. clicked or tapped) the system can display all the icons of groups at its next display level, each being a subgroup of that display group (i.e. the system can display the representative images determined for the display subgroups).

In the particular example shown in FIGS. 13A and 13B, the next display level includes a plurality of similar image subgroups. The resulting display shown in FIGS. 13A and 13B also occupies more than the full screen of the device. As a result, the representative images 1312 may be shown in a scrollable view on the computing device.

The representative group images for each representative image 1312 are shown placed in a queue (i.e. one behind another) in the 3D scene, and then displayed by a perspective projection. In FIG. 13A, the perspective projection has been generated such that the first representative group image in the queue appears around the left bottom corner of the display screen space allocated to that display subgroup, and the queue expands towards the right top corner of the display screen space allocated to that display subgroup. As with the representative image 1100, each representative image 1312 includes an allocation criteria marker 1360 (though, in this case, each representative image 1312 has the same allocation criteria marker 1360 because they have been assigned to the subgroups based on derived pixel content data). As well, each representative image 1312 includes an image number marker 1350.

Once the animation button 1320 of the representative image 1312 for a particular subgroup is selected, all the representative group images (for the representative image of that particular subgroup) in the queue can start to move towards the left bottom corner of the allocated display screen space. The first representative group image can become more and more translucent when it moves closer and closer to the left bottom corner of the allocated display screen space and eventually disappear while a new representative group image (initially not shown in the allocated display screen space) can move into the boundary of the allocated display screen space. Once again, in this example, the animation may play all representative group images in the queue cyclically.

Figure 14B:
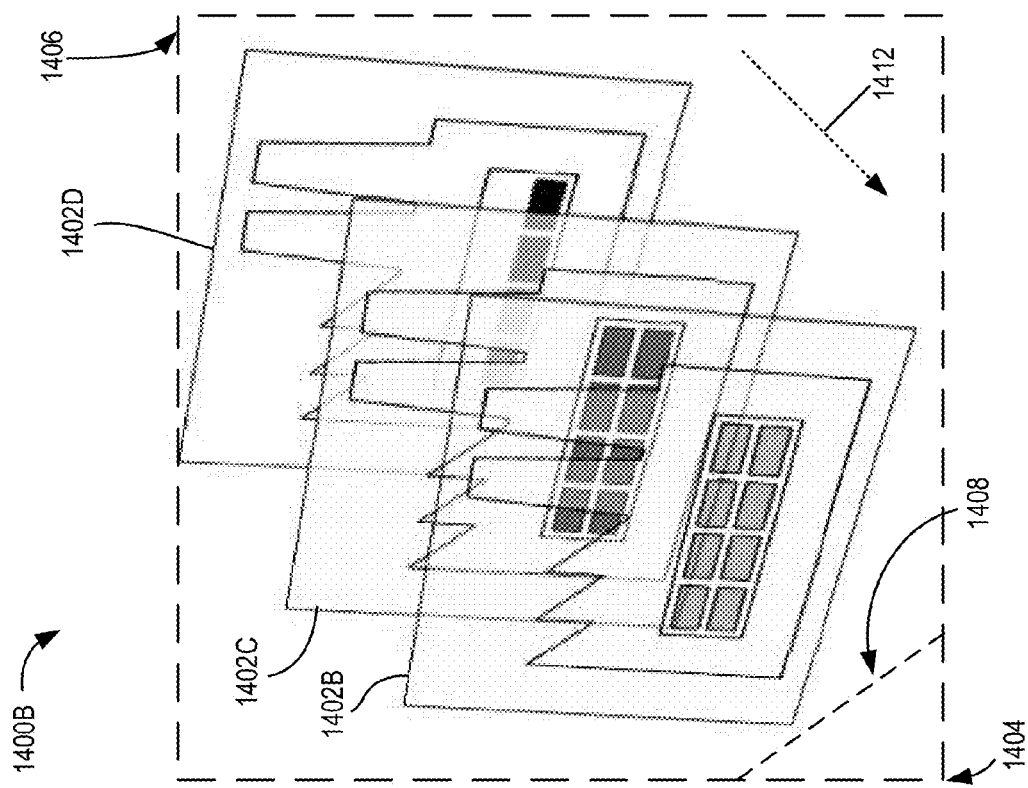
FIG. 14B shows another example of the representative image of FIG. 14A with a second plurality of perspective projections.
Figure 14A:
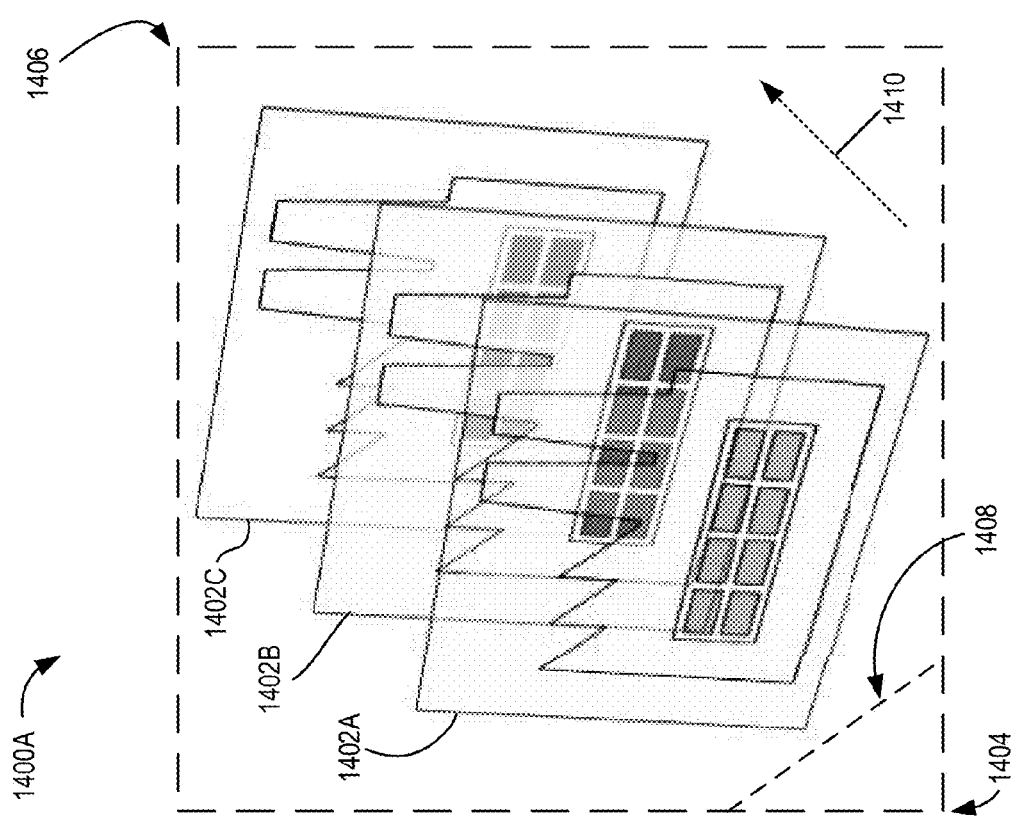
FIG. 14A shows an example of a representative image with a first plurality of perspective projections that may be displayed to a user in an embodiment of the system of FIG. 1.
Figure 14C:
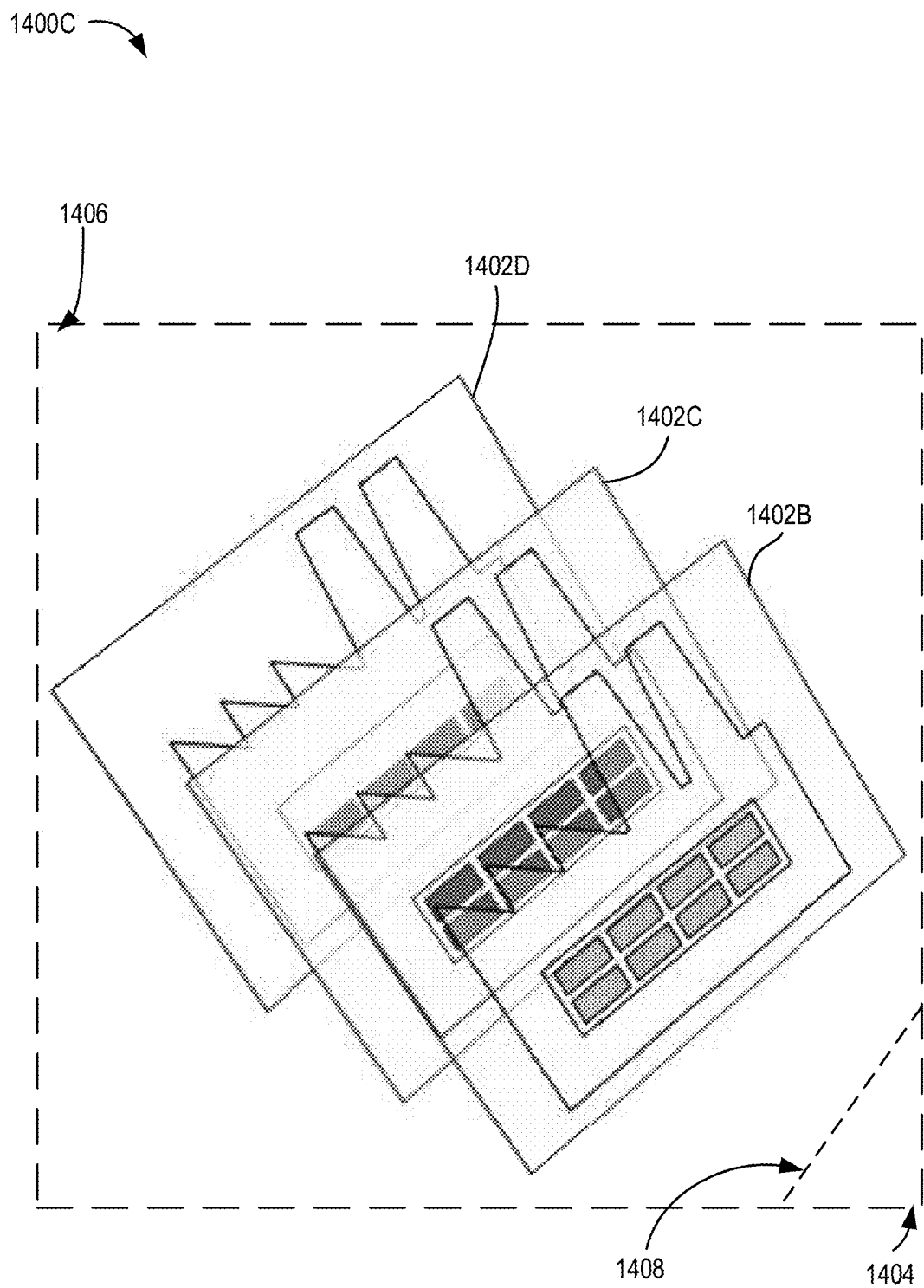
FIG. 14C shows another example of the representative image of FIG. 14A with the plurality of perspective projections having a different projection angle.

Reference will now be made to FIGS. 14A-14C in conjunction with FIG. 6. FIGS. 14A-14C illustrate a representative image 1400 using perspective projections of a plurality of representative group images 1402A-1402D. The representative group images 1402A-1402D are images from a similar image group.

At 630, the representative image 1400A for the display group can be generated. The computing device can generate the representative image to include at least a portion of the perspective projection for each representative group image 1402A-1402C in the selected subset of representative group images. For example, the computing device can overlap the perspective projections for each representative group image 1402A-1402C in the selected subset of representative group images.

In some cases, overlapping the image portions may also include blending pixels from the representative group images 1402 being overlapped. For example, in some cases an animated representative image may be generated where the opacity (or transparency) of each representative group image 1402 changes as it moves through the representative image 1400. The same portions of each representative group image 1402 may overlap while both are visible in the representative image 1400, however the pixel blending may change based on the opacity or transparency of each representative group image 1402 being overlapped.

In some embodiments, the representative image 1400 can include a first peripheral boundary 1404 (e.g. the bottom side or the bottom left corner) and a second peripheral boundary 1406 (e.g. the top side or the top right corner) opposite the first peripheral boundary. The perspective projections for each representative group image 1402 in the selected subset of representative group images can be initially overlapped so that the perspective projection of a first representative group image 1402A from the selected subset of representative group images overlaps the perspective projection of at least one additional representative group image 1402B-1402C from the selected subset of representative group images. The perspective projection of the first representative group image 1402A can be proximate the first peripheral boundary 1404 and the perspective projection of each additional representative group image 1402B-1402C can be increasingly displaced from the perspective projection of the first representative group image 1402A in a first direction 1410 towards the second peripheral boundary 1406.

At 640, the representative image 1400 (i.e. the overlapping perspective projections) can be progressively displayed. In some embodiments, progressively displaying the representative image 1400 can include progressively moving the perspective projection of each representative group image 1402 in the selected subset of representative group images in a second direction 1412 towards the first peripheral boundary 1404. The perspective projection of each representative group image 1402 in the selected subset of representative group images can be removed from the representative image 1400 when that perspective projection reaches a threshold location 1408 proximate the first peripheral boundary 1404. As shown in FIG. 14B, the representative group image 1402A is no longer in the representative image 1400B as it reached the threshold location 1408 as a result of the animation between 1400A and 1400B.

Displaying the representative image 1400 can further include progressively introducing the perspective projection of each representative group image 1402 in the selected subset of representative group images into the representative image 1400 proximate the second peripheral boundary 1406, moving the perspective projection of each representative group image 1402 towards the first peripheral boundary 1404 and then removing the perspective projection of each representative group image 1402 from the representative image when that perspective projection reaches the threshold location 1404. As shown in FIG. 14B, a new representative group image 1402D has been introduced into the display of the representative image 1400B.

In some embodiments, the perspective projection for each representative group image 1402 may be substantially opaque when introduced into the representative image 1400. Each representative group image 1402 may gradually become at least semitransparent as it moves towards the first peripheral boundary 1404 (See FIGS. 14A-14B). As mentioned above, the blending of pixels from the various representative group images 1402 may thus change as the representative image 1400 is animated. As each representative group image 1402 moves through the representative image 1400, that representative group image 1402 may become at least partially transparent to allow the subsequent representative group images 1402 to be seen more clearly.

In some embodiments, the perspective projection of each representative group image 1402 in the selected subset of representative group images can be generated at a first projection angle. However, in some embodiments GUIs may be provided to change those perspective projections.

A user interface can be provided in association with the computer device display for receiving an input from a user. An input can be received from the user indicating that one or more of the perspective projections should be changed. Based on the input from the user, the computing device can re-generate the representative image 1400C to include at least a portion of a second perspective projection for each representative group image 1402 in the selected subset of representative group images, the second perspective projection being generated at a second projection angle that is different from the first projection angle. FIG. 14C shows a representative image 1400C that corresponds to the representative image 1400B shown in FIG. 14B, but with a different perspective projection angle. As well, because of the change in projection angle the direction of animation may change and thus the position of the first peripheral boundary 1404, second peripheral boundary 1406, and threshold position 1408 may also change.

Figure 16:
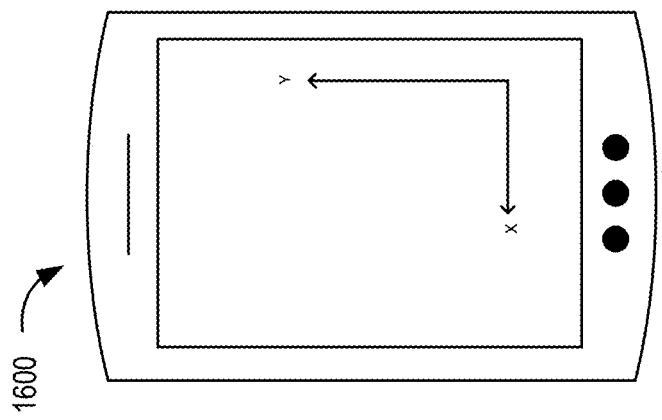
FIG. 16 shows a diagram of an example device that may be used in an embodiment of the system of FIG. 1.

In some embodiments, a touchscreen user interface can be provided to allow a user to change a perspective projection. FIG. 16 shows an example of a device 1600 equipped with a touch screen (with X and Y axes). The device 1600 is an example of a computing device 102 that is capable of detecting touch-screen gestures such as long-press (press and hold for a while) and drag (keep pressing the screen while fingers move around). In one example, a user may long-press (press and hold for a while) an icon to indicate that a perspective projection is to be changed. The user may then perform a drag gesture to change the projection angle of the perspective projection. The perspective projection used to display that icon can be changed according to the direction and distance of users' dragging gestures. Let $\alpha$ and $\beta$ be the distance that users drag along with X and Y axes, respectively. Then the perspective projection M can be multiplied by the product of the following two matrices:

$$\begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix}$$

to generate the second perspective projection. In some cases, a single drag action may be used to adjust the perspective projection of each representative image being concurrently displayed on the display device.

As mentioned above, in some embodiments the representative image for a display group may include a plurality of representative image portions. Each representative image portion may include at least one subgroup representative image corresponding to a subgroup of the display group. In some embodiments, process 600 can be applied for each of the representative image portions of the representative image. That is, each representative image portion may include a subgroup representative image with perspective projection of one or more representative subgroup images for that subgroup (that may overlap one another). As well, in some embodiments each representative image can be an animated representative image that can be independently animated when displayed to a user.

As mentioned above, in some embodiments a GUI can be provided to allow users to explore representative images (i.e. icons of groups of images) via the hierarchical structure either horizontally (i.e., from a higher level to a lower level and vice versa), or vertically (i.e., across each level), or both. Each representative image at any level other than the bottom full resolution level can be selected by the user, e.g. by clicking or tapping.

Figure 15:
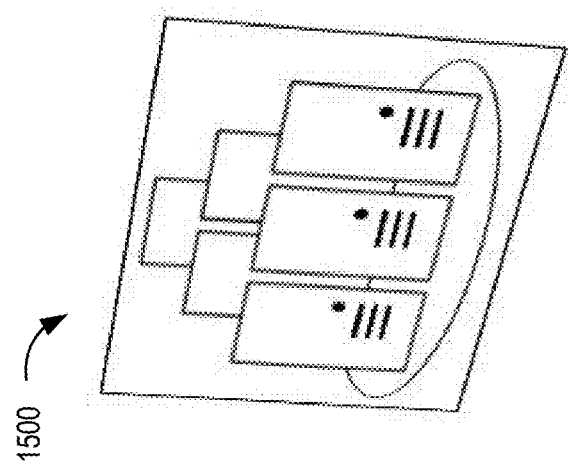
FIG. 15 shows another example of a representative image that may be displayed to a user in an embodiment of the system of FIG. 1.

For an icon of an individual image (an image icon), when it is clicked or tapped, the image can be displayed at its full resolution. FIG. 15 shows an example image icon 1500, which is generated using the image itself. Specifically, the image, resized properly to fit in its allocated display screen space, is displayed by a perspective projection in which the image is tilted.

In some embodiments, when a representative image (a group icon other than an image icon) for a group, say $\pi$, is selected (e.g. clicked or tapped) the subgroups of that group at a group level lower than the group level of that group $\pi$ may be displayed. This group level is referred to as the "next display group level" of that group $\pi$. All groups at the next display level of $\pi$ are subgroups of the display group corresponding to $\pi$. We may define a lowest constrained zooming level (LCZL) of $\pi$ as the lowest group level which is lower than the group level of $\pi$, and at which each disjoint group that is a subgroup of the display group corresponding to $\pi$ can have their representative image displayed in a total allocated display screen space less than a prescribed space threshold.

In some embodiments, the next display level of $\pi$ may be the LCZL of $\pi$ if there are two or more disjoint groups at the next display level of $\pi$. In some embodiments, the prescribed space threshold may be no more than twice the full display screen size (without scrolling) of the device display. An example procedure for determining the next display level of $\pi$ is described below with reference to FIG. 7.

Figure 7:
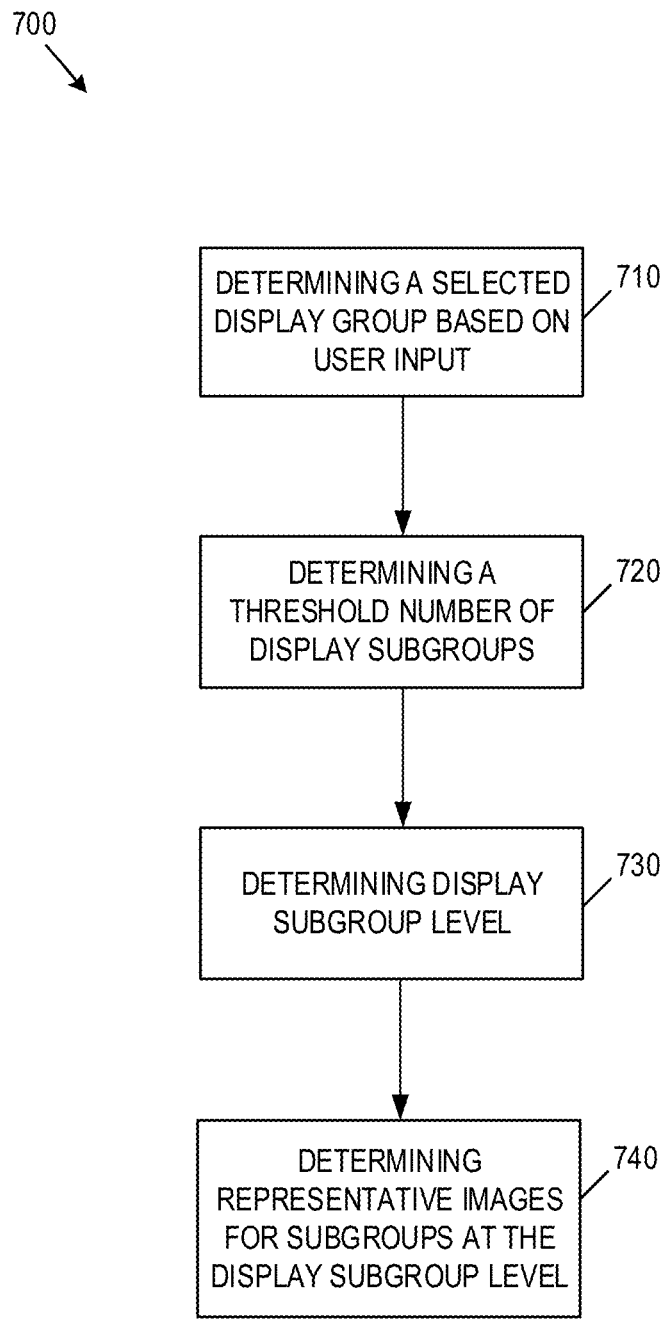
FIG. 7 shows a flowchart of an example embodiment of a method for determining representative images of subgroups to be displayed that may be used with an embodiment of the method for organizing images of FIG. 3.

Referring now to FIG. 7, shown therein is an example embodiment of a process 700 for determining a display subgroup level. When a particular display group is selected by a user, process 700 can be used to determine the plurality of display subgroups for the selected display group whose representative images should be displayed to the user. In some cases, rather than simply moving down one group level in the hierarchical structure, process 700 may enable faster and more efficient navigation of a collection of images by jumping down multiple group levels to a group level with multiple subgroups to be displayed to the user.

At 710, a selected display group can be determined based on input from a user. The representative images for plurality of display groups may be displayed to the user, and the user may select one of the displayed representative images. The selected representative image may be the representative image for the selected display group.

In general, process 700 may be unnecessary where the selected display group has a number of images less than a threshold number of images. For example, if the allocated screen size for the selected display group is sufficient to display all the images in the selected display group, it may be unnecessary to perform process 700. Accordingly, process 700 will typically be performed where the selected display group includes a number of images greater than a threshold number of images, the threshold number of images being an integer greater than 1. The threshold number of images may be determined based on the screen size of the display of the computing device.

At 720, a threshold number of display subgroups can be determined by identifying a maximum number of representative images that are concurrently displayable. The maximum number of representative images that are concurrently displayable can be determined based on the allocated screen size of the computer device display for the selected display group and the maximum representative image size for each representative image (i.e. the amount of the allocated screen size that may be allocated to a single representative image).

At 730, a display subgroup level can be determined. In general, the computing device can determine a plurality of subgroups of images for the selected display group. Each image in the selected display group can be allocated to at least one of the subgroups of images, and the plurality of subgroups of images may include subgroups across a plurality of subgroup levels. Each subgroup level includes a plurality of disjoint level-specific subgroups.

The display subgroup level can be determined from the plurality of subgroup levels by identifying the subgroup level that has the greatest number of level-specific subgroups not more than the threshold number of display subgroups, and where each image in the selected display group is allocated to at least one of the level-specific subgroups in that subgroup level.

Example Algorithm 2—Determining a Display Subgroup Level

Assign numbers to each subgroup level with 0 set as the level for individual images (For example, one could assign year, month, event, WS, SS, and Individual Levels with numbers 5, 4, 3, 2, 1 and 0, respectively). Let T[i] denote the maximum number of representative images at level i, i=0, 1, 2, 3, 4 or 5, that can be concurrently displayed within a prescribed display screen space. In some embodiments, the prescribed display screen space can be selected to be no more than twice the full display screen size (without scrolling) of the device. Given a representative image for a group A at the level L which is not an image icon, algorithm 2 is an example process to determine the next display subgroup level.

Algorithm 2:

```
current_level = L
Do
        current_level = current_level − 1
        N = number of groups at current_level each being a subgroup
of the group corresponding to A While ( N ≤ T[current_level] ) &&
current_level > 0 )
If (N ≥ T[current_level] && current_level < L − 1) do
                current_level = current_level + 1
                N = number of groups at current_level each
being a subgroup of the group corresponding to A
                If (N == 1) do
                current_level = current_level − 1
                End if
End if
Return current_level
```

At 740, the computing device can determine a plurality of representative images for the plurality of display subgroups. The plurality of level-specific subgroups in the display subgroup level identified at 730 may be identified as the display subgroups. For each display subgroups, a representative image can be determined to represent all of the images in that display subgroup. The representative image can be determined to have an image size no greater than the representative image size. The plurality of representative images for the plurality of display subgroups can then be concurrently displayed on the computer device display.

For example, consider the hierarchical structure shown in FIG. 8. If the selected display group is the open group 812A, and all the images allocated to the open group are allocated to the same year, month and event groups, the computing device may determine that the display subgroup level is the weakly similar image group level 804E. The representative images of the subgroups at the weakly similar image group level 804E can then be displayed to the user when the open group 812A is selected, rather than requiring the user to select the year group, month group, and event group in turn before reaching the weakly similar image group level 804E. This may facilitate more rapid navigation of large image collections organized by a large number of image allocation criteria.

A number of example embodiments have been described herein. However, it will be understood by persons skilled in the art that other variations and modifications may be made without departing from the scope of the embodiments as defined in the claims appended hereto.

The invention claimed is:

1. A computer-implemented method of organizing a plurality of images, the method comprising:
   for each image in the plurality of images, operating a computer processor to determine at least one image allocation criteria, the at least one image allocation criteria including at least one image-specific allocation criteria, wherein the at least one image-specific allocation criteria comprises a similarity distance between that image and at least one other image in the plurality of images measuring how similar in appearance that image and the at least one other image are;
   allocating the plurality of images into a plurality of groups of images such that each image in the plurality of images is allocated to at least one group in the plurality of groups of images using the image allocation criteria for each image, wherein the plurality of groups of images comprises a plurality of similar image groups and the plurality of images are divided into the plurality of similar image groups by allocating each image in the plurality of images to one of the similar image groups based on the at least one image-specific allocation criteria for that image;
   determining a plurality of display groups as a subset of groups from the plurality of groups of images;
   determining a plurality of representative images by, for each display group in the plurality of display groups, determining a representative image for representing all of the images in that display group;
   for at least one display group in the plurality of display groups, each display group in the at least one display group comprising a number of images greater than a threshold number of images, the threshold number of images being an integer greater than 1;
      determining the representative image for each display group in the at least one display group by
         selecting a subset of representative group images, the subset of representative group images including at least two of the images in that display group; and
         generating the representative image to include at least a portion of each representative group image in the selected subset of representative group images, wherein generating the representative image comprises
            generating a perspective projection of each representative group image in the selected subset of representative group images; and
            generating the representative image to comprise at least a portion of the perspective projection for each representative group image in the selected subset of representative group image by overlapping the perspective projections for each representative group image in the selected subset of representative group images;
         wherein
         the representative image comprises a first peripheral boundary and a second peripheral boundary opposite the first peripheral boundary;
         the perspective projections for each representative group image in the selected subset of representative group images are initially overlapped so that the perspective projection of a first representative group image from the selected subset of representative group images overlaps the perspective projection of at least one additional representative group image from the selected subset of representative group images, wherein the perspective projection of the first representative group image is proximate the first peripheral boundary and the perspective projection of each additional representative group image are increasingly displaced from the perspective projection of the first representative group image in a first direction towards the second peripheral boundary; and
         displaying the representative image comprises progressively moving the perspective projection of each representative group image in the selected subset of representative group images in a second direction towards the first peripheral boundary, and removing the perspective projection of each representative group image in the selected subset of representative group images from the representative image when that perspective projection reaches a threshold location proximate the first peripheral boundary; and
   concurrently displaying the plurality of representative images on a computer device display.

2. The computer-implemented method as defined in claim 1, further comprising, for each image in the plurality of images, determining the similarity distance between that image and the at least one other image in the plurality of images by comparing image-specific pixel content of at least some pixels of that image with image-specific pixel content of at least some pixels of the at least one other image to measure how similar in appearance that image and the at least one other image are.

3. The computer-implemented method as defined in claim 1 further comprising, for at least one display group in the plurality of display groups, that display group comprising a number of images greater than a threshold number of images, the threshold number of images being an integer greater than 1:
   determining a plurality of subgroups of images for that display group wherein each image in that display group is allocated to one of the subgroups of images; and determining a plurality of subgroup representative images by, for each subgroup in that display group, determining a subgroup representative image representing all of the images in that subgroup.

4. The computer-implemented method as defined in claim 1 further comprising, for at least one display group in the plurality of display groups, that display group comprising a number of images greater than a threshold number of images, the threshold number of images being an integer greater than 1:
determining a plurality of subgroups of images for that display group wherein each image in that display group is allocated to one of the subgroups of images; and
determining the representative image for that display group by
determining a plurality of subgroup representative images, one subgroup representative image for each subgroup of images in the plurality of subgroups of images; and
generating the representative image for that display group to include a plurality of representative image portions, each representative image portion comprising the subgroup representative image for one of the subgroups of images in the plurality of subgroups of images.

5. The computer-implemented method as defined in claim 4 wherein, for a particular display group in the at least one display group:
the plurality of subgroups of images comprise a first similar image group from the plurality of similar image groups, the first similar image group comprising a plurality of first similar images, each first similar image having a similarity distance between that first similar image and at least one of the other first similar images within a similarity threshold range; and
the subgroup representative image is determined for the first similar image group by
selecting a plurality of representative first similar images from the plurality of first similar images; and
generating the subgroup representative image for the first similar image group to include at least a portion of each representative first similar image in the plurality of representative first similar images.

6. The computer-implemented method as defined in claim 5, wherein generating the subgroup representative image for the first similar image group comprises partially overlapping each of the representative first similar images.

7. The computer-implemented method as defined in claim 5 wherein, for the particular display group:
the plurality of subgroups of images further comprises at least one additional similar image group from the plurality of similar image groups, each additional similar image group comprising a plurality of additional similar images, for each additional similar image group each additional similar image in that additional similar image group has a similarity distance between that additional similar image and at least one of the other additional similar images in that additional similar image group within the similarity threshold range for that additional similar image group, where the plurality of first similar images and each plurality of additional similar images are disjoint and each plurality of additional similar images is disjoint from every other plurality of additional similar images;
for each additional similar image group, the subgroup representative image is determined by
selecting a plurality of representative additional similar images from the plurality of additional similar images in that additional similar image group; and
generating the subgroup representative image for the additional similar image group to include at least a portion of each representative additional similar image in the plurality of representative additional similar images.

8. The computer-implemented method as defined in claim 1 further comprising:
providing a user interface in association with the computer device display for receiving an input from a user;
receiving the input from the user;
based on the input from the user, determining a selected representative image in the plurality of representative images, the selected representative image being the representative image for a selected display group from the plurality of display groups, the selected display group comprising a number of images greater than a threshold number of images, the threshold number of images being an integer greater than 1;
determining an allocated screen size of the computer device display for the selected display group;
determining if the allocated screen size of the computer device display is sufficient to concurrently display the number of images in the selected display group;
if the allocated screen size of the computer device display is sufficient, then displaying the images in the selected display group on the computer device display; and
if the allocated screen size of the computer device display is not sufficient, then:
determining a plurality of subgroups of images for the selected display group wherein each image in the selected display group is allocated to one of the subgroups of images;
determining a plurality of representative images for the determined plurality of subgroups of images by, for each subgroup in the selected display group, determining a representative image for that subgroup representing all of the images in that subgroup; and
displaying, on the computer device display, the plurality of representative images for the determined plurality of subgroups of images.

9. The computer-implemented method as defined in claim 1, further comprising, for each display group in the at least one display group:
determining a maximum representative image size for that display group based on an allocated display size of the computer device display for the plurality of display groups;
generating the representative image for that display group to have a total image size greater than the maximum representative image size for that display group; and
displaying the representative image for that display group by displaying a portion of the representative image;
wherein the displayed portion of the representative image has a portion size no greater than the maximum representative image size.

10. The computer-implemented method as defined in claim 9, wherein, for a particular display group in the at least one display group, displaying the representative image for the particular display group comprises successively displaying each portion of the representative image for the particular display group.

11. The computer-implemented method of claim 1, wherein displaying the representative image further comprises progressively introducing the perspective projection of each representative group image in the selected subset of representative group images into the representative image proximate the second peripheral boundary, moving the perspective projection of each representative group image towards the first peripheral boundary and then removing the perspective projection of each representative group image from the representative image when that perspective projection reaches the threshold location.

12. The computer-implemented method of claim 11, wherein the perspective projection for each representative group image is substantially opaque when introduced into the representative image and gradually becomes at least semitransparent as it moves towards the first peripheral boundary.

13. The computer-implemented method of claim 1, wherein the perspective projection of each representative group image in the selected subset of representative group images is generated at a first projection angle, and the method further comprises:
    providing a user interface in association with the computer device display for receiving an input from a user;
    receiving the input from the user;
    based on the input from the user, re-generating the representative image to comprise at least a portion of a second perspective projection for each representative group image in the selected subset of representative group images, the second perspective projection being generated at a second projection angle, where the second projection angle is different from the first projection angle.

14. The computer-implemented method as defined in claim 1 further comprising:
    determining a maximum representative image size for each display group by
        identifying an allocated display size of the computer device display for the plurality of display groups;
        dividing the allocated display size into a plurality of display group portions, one display group portion for each display group in the plurality of display groups;
        determining the maximum representative image size for each display group as a size of the display group portion for that display group; and
    determining the representative image for each display group in the plurality of display groups to have a representative image size no greater than the maximum representative image size for that display group.

15. The computer-implemented method as defined in claim 1, further comprising:
    providing a user interface in association with the computer device display for receiving an input from a user;
    receiving the input from the user;
    based on the input from the user, determining a selected representative image in the plurality of representative images, the selected representative image being the representative image for a selected display group from the plurality of display groups, and the selected display group comprising a number of images greater than a threshold number of images, the threshold number of images being an integer greater than 1;
    determining a plurality of display subgroups for the selected display group by
        determining a plurality of subgroups of images for the selected display group wherein each image in the selected display group is allocated to at least one of the subgroups of images, the plurality of subgroups of images comprising a plurality of subgroup levels each subgroup levels comprising a plurality of disjoint level-specific subgroups;
        determining an allocated screen size of the computer device display for the selected display group;
        determining a threshold number of display subgroups by identifying a maximum number of representative images that are concurrently displayable in the allocated screen size with each subgroup representative image having an image size no greater than a maximum representative image size;
        identifying a display subgroup level from the plurality of subgroup levels by identifying the subgroup level comprising the greatest number of level-specific subgroups not more than the threshold number of display subgroups and wherein each image in the selected display group is allocated to at least one of the level-specific subgroups in that subgroup level;
        identifying the plurality of display subgroups as the plurality of level-specific subgroups in the display subgroup level;
    determining a plurality of representative images for the plurality of display subgroups by, for each display subgroup in the plurality of display subgroups, determining a representative image for representing all of the images in that display subgroup, the representative image having an image size no greater than the representative image size; and
    concurrently displaying the plurality of representative images for the plurality of display subgroups on the computer device display.

16. The computer-implemented method as defined in claim 1, wherein:
    determining the at least one image allocation criteria for each image in the plurality of images comprises assigning an access level to that image, the access level representing image management restrictions for that image; and
    each image is allocated to the at least one group in the plurality of groups of images by allocating that image to at least one group having image management restrictions corresponding to the access level of that image.

17. The computer-implemented method as defined in claim 1, wherein:
    determining the at least one image allocation criteria for each image in the plurality of images comprises
        determining at least one metadata allocation criteria from image metadata associated with that image; and
        allocating that image to a particular group in the plurality of groups of images based on the at least one metadata allocation criteria for that image.

18. A computer program product for use on a computing device to organize a plurality of images, the computer program product comprising:
    a non-transitory recording medium; and
    instructions recorded on the recording medium, the instructions for configuring a processor of the computing device to:
        for each image in the plurality of images, determine at least one image allocation criteria, the at least one image allocation criteria including at least one image-specific allocation criteria, wherein the at least one image-specific allocation criteria comprises a similarity distance between that image and at least one other image in the plurality of images measuring how similar in appearance that image and the at least one other image are;

allocate the plurality of images into a plurality of groups of images such that each image in the plurality of images is allocated to at least one group in the plurality of groups of images using the image allocation criteria for each image, wherein the plurality of groups of images comprises a plurality of similar image groups and the plurality of images are divided into the plurality of similar image groups by allocating each image in the plurality of images to one of the similar image groups based on the at least one image-specific allocation criteria for that image;

determine a plurality of display groups as a subset of groups from the plurality of groups of images;

determine a plurality of representative images by, for each display group in the plurality of display groups, determining a representative image for representing all of the images in that display group;

for at least one display group in the plurality of display groups, each display group in the at least one display group comprising a number of images greater than a threshold number of images, the threshold number of images being an integer greater than 1, determine the representative image for each display group in the at least one display group by, selecting a subset of representative group images, the subset of representative group images including at least two of the images in that display group; and generating the representative image to include at least a portion of each representative group image in the selected subset of representative group images by, generating a perspective projection of the each representative group image in the selected subset of representative group images; and generating the representative image to comprise at least a portion of the perspective projection for each representative group image in the selected subset of representative group image by overlapping the perspective projections for each representative group image in the selected subset of representative group image;

wherein the representative image comprises a first peripheral boundary and a second peripheral boundary opposite the first peripheral boundary;

the perspective projections for each representative group image in the selected subset of representative group images are initially overlapped so that the perspective projection of a first representative group image from the selected subset of representative group images overlaps the perspective projection of at least one additional representative group image from the selected subset of representative group images, wherein the perspective projection of the first representative group image is proximate the first peripheral boundary and the perspective projection of each additional representative group image are increasingly displaced from the perspective projection of the first representative group image in a first direction towards the second peripheral boundary; and displaying the representative image comprises progressively moving the perspective projection of each representative group image in the selected subset of representative group images in a second direction towards the first peripheral boundary, and removing the perspective projection of each representative group image in the selected subset of representative group images from the representative image when that perspective projection reaches a threshold location proximate the first peripheral boundary; and concurrently display the plurality of representative images on a display of the computing device.

19. The computer program product as defined in claim 18, further comprising instructions for configuring the processor to:

for each image in the plurality of images, determine the similarity distance between that image and the at least one other image in the plurality of images by comparing image-specific pixel content of at least some pixels of that image with image-specific pixel content of at least some pixels of the at least one other image to measure how similar in appearance that image and the at least one other image are.

20. The computer program product as defined in claim 18, further comprising instructions for configuring the processor to, for at least one display group in the plurality of display groups, that display group comprising a number of images greater than a threshold number of images, the threshold number of images being an integer greater than 1:

determine a plurality of subgroups of images for that display group wherein each image in that display group is allocated to one of the subgroups of images; and determine a plurality of subgroup representative images by, for each subgroup in that display group, determining a subgroup representative image representing all of the images in that subgroup.

21. The computer program product as defined in claim 18, further comprising instructions for configuring the processor to, for at least one display group in the plurality of display groups, that display group comprising a number of images greater than a threshold number of images, the threshold number of images being an integer greater than 1:

determine a plurality of subgroups of images for that display group wherein each image in that display group is allocated to one of the subgroups of images; and determine the representative image for that display group by determining a plurality of subgroup representative images, one subgroup representative image for each subgroup of images in the plurality of subgroups of images; and generating the representative image for that display group to include a plurality of representative image portions, each representative image portion comprising the subgroup representative image for one of the subgroups of images in the plurality of subgroups of images.

22. The computer program product as defined in claim 21 wherein, for a particular display group in the at least one display group, the plurality of subgroups of images comprise a first similar image group from the plurality of similar image groups, the first similar image group comprising a plurality of first similar images, each first similar image having a similarity distance between that first similar image and at least one of the other first similar images within a similarity threshold range, and the computer program product further comprises instructions for configuring the processor to:

determine the subgroup representative image for the first similar image group by selecting a plurality of representative first similar images from the plurality of first similar images; and generating the subgroup representative image for the first similar image group to include at least a portion of each representative first similar image in the plurality of representative first similar images.

23. The computer program product as defined in claim 22, further comprising instructions for configuring the processor to generate the subgroup representative image for the first similar image group by partially overlapping each of the representative first similar images.

24. The computer program product as defined in claim 22, wherein, for the particular display group the plurality of subgroups of images further comprises at least one additional similar image group from the plurality of similar image groups, each additional similar image group comprising a plurality of additional similar images, for each additional similar image group each additional similar image in that additional similar image group has a similarity distance between that additional similar image and at least one of the other additional similar images in that additional similar image group within the similarity threshold range for that additional similar image group, where the plurality of first similar images and each plurality of additional similar images is disjoint and each plurality of additional similar images is disjoint from every other plurality of additional similar images, and the computer program product further comprises instructions for configuring the processor to:
 determine the subgroup representative image for each additional similar image group by
  selecting a plurality of representative additional similar images from the plurality of additional similar images in that additional similar image group; and
  generating the subgroup representative image for the additional similar image group to include at least a portion of each representative additional similar image in the plurality of representative additional similar images.

25. The computer program product as defined in claim 18, further comprising instructions for configuring the processor to:
 provide a user interface in association with the display of the computing device for receiving an input from a user;
 receive the input from the user;
 based on the input from the user, determine a selected representative image in the plurality of representative images, the selected representative image being the representative image for a selected display group from the plurality of display groups, the selected display group comprising a number of images greater than a threshold number of images, the threshold number of images being an integer greater than 1;
 determine an allocated screen size of the computer device display for the selected display group;
 determine if the allocated screen size of the computer device display is sufficient to concurrently display the number of images in the selected display group;
 if the allocated screen size of the computer device display is sufficient, then display the images in the selected display group on the computer device display; and
 if the allocated screen size of the computer device display is not sufficient, then:
  determine a plurality of subgroups of images for the selected display group wherein each image in the selected display group is allocated to one of the subgroups of images;
  determine a plurality of representative images for the determined plurality of subgroups of images by, for each subgroup in the selected display group, determining a representative image for that subgroup representing all of the images in that subgroup; and
  display the plurality of representative images for the determined plurality of subgroups of images on the display of the computing device.

26. The computer program product as defined in claim 18, further comprising instructions for configuring the processor to, for each display group in the at least one display group:
 determine a maximum representative image size for that display group based on an allocated display size of the computer device display for the plurality of display groups;
 generate the representative image for that display group to have a total image size greater than the maximum representative image size for that display group; and
 display the representative image for that display group by displaying a portion of the representative image;
 wherein the displayed portion of the representative image has a portion size no greater than the maximum representative image size.

27. The computer program product as defined in claim 26, further comprising instructions for configuring the processor to, for a particular display group in the at least one display group, display the representative image for the particular display group by successively displaying each portion of the representative image for the particular display group.

28. The computer program product as defined in claim 18, further comprising instructions for configuring the processor to display the representative image by progressively introducing the perspective projection of each representative group image in the selected subset of representative group images into the representative image proximate the second peripheral boundary, moving the perspective projection of each representative group image towards the first peripheral boundary and then removing the perspective projection of each representative group image from the representative image when that perspective projection reaches the threshold location.

29. The computer program product as defined in claim 28, further comprising instructions for configuring the processor to introduce the perspective projection for each representative group image into the representative image substantially opaque and gradually adjust the perspective projection for each representative group image to become at least semi-transparent as it moves towards the first peripheral boundary.

30. The computer program product as defined in claim 18, further comprising instructions for configuring the processor to:
 generate the perspective projection of each representative group image in the selected subset of representative group images at a first projection angle;
 provide a user interface in association with the display of the computing device for receiving an input from a user;
 receive the input from the user; and
 based on the input from the user, re-generate the representative image to comprise at least a portion of a second perspective projection for each representative group image in the selected subset of representative group images, the second perspective projection being generated at a second projection angle, where the second projection angle is different from the first projection angle.

31. The computer program product as defined in claim 18, further comprising instructions for configuring the processor to:

determine a maximum representative image size for each display group by
  identifying an allocated display size of the display for the plurality of display groups;
  dividing the allocated display size into a plurality of display group portions, one display group portion for each display group in the plurality of display groups; and
  determining the maximum representative image size for each display group as a size of the display group portion for that display group; and
determine the representative image for each display group in the plurality of display groups to have a representative image size no greater than the maximum representative image size for that display group.

32. The computer program product as defined in claim 18, further comprising instructions for configuring the processor to:
provide a user interface in association with the display for receiving an input from a user;
receive the input from the user;
based on the input from the user, determine a selected representative image in the plurality of representative images, the selected representative image being the representative image for a selected display group from the plurality of display groups, and the selected display group comprising a number of images greater than a threshold number of images, the threshold number of images being an integer greater than 1;
determine a plurality of display subgroups for the selected display group by
  determining a plurality of subgroups of images for the selected display group wherein each image in the selected display group is allocated to at least one of the subgroups of images, the plurality of subgroups of images comprising a plurality of subgroup levels each subgroup levels comprising a plurality of disjoint level-specific subgroups;
  determining an allocated screen size of the computer device display for the selected display group;
  determining a threshold number of display subgroups by identifying a maximum number of representative images that are concurrently displayable in the allocated screen size with each representative image having an image size no greater than a maximum representative image size;
  identifying a display subgroup level from the plurality of subgroup levels by identifying the subgroup level comprising the greatest number of level-specific subgroups not more than the threshold number of display subgroups and wherein each image in the selected display group is allocated to at least one of the level-specific subgroups in that subgroup level;
  identifying the plurality of display subgroups as the plurality of level-specific subgroups in the display subgroup level;
determine a plurality of representative images for the plurality of display subgroups by, for each display subgroup in the plurality of display subgroups, determining a representative image for representing all of the images in that display subgroup, the representative image having an image size no greater than the representative image size; and
concurrently display the plurality of representative images for the plurality of display subgroups on the display.

33. The computer program product as defined in claim 18, further comprising instructions for configuring the processor to:
determine the at least one image allocation criteria for each image in the plurality of images by assigning an access level to that image, the access level representing image management restrictions for that image; and
allocate each image to the at least one group in the plurality of groups of images by allocating that image to at least one group having image management restrictions corresponding to the access level of that image.

34. The computer program product as defined in claim 18, further comprising instructions for configuring the processor to:
determine the at least one image allocation criteria for each image in the plurality of images by
  determining at least one metadata allocation criteria from image metadata associated with that image; and
  allocating that image to a particular group in the plurality of groups of images based on the at least one metadata allocation criteria for that image.

35. A device for organizing a plurality of images, the device comprising:
a processor;
a display; and
a non-volatile device memory having stored thereon instructions for configuring the processor to:
  determine a plurality of groups of images, the plurality of groups of images being defined by allocating each image in the plurality of images to at least one group in the plurality of groups of images using at least one image allocation criteria determined for each image, the image allocation criteria for each image including at least one image-specific allocation criteria, wherein the at least one image-specific allocation criteria comprises a similarity distance between that image and at least one other image in the plurality of images measuring how similar in appearance that image and the at least one other image are, and the plurality of groups of images comprising a plurality of similar image groups with the plurality of images divided into the plurality of similar image groups by allocating each image in the plurality of images to one of the similar image groups based on the at least one image-specific allocation criteria for that image;
  determine a plurality of display groups as a subset of groups from the plurality of groups of images;
  determine a plurality of representative images, one representative image for each display group in the plurality of display groups, the representative image for each display group representing all of the images in that display group;
  for at least one display group in the plurality of display groups, each display group in the at least one display group comprising a number of images greater than a threshold number of images, the threshold number of images being an integer greater than 1, determine the representative image for each display group in the at least one display group by,
    selecting a subset of representative group images, the subset of representative group images including at least two of the images in that display group; and
    generating the representative image to include at least a portion of each representative group image in the selected subset of representative group images by, generating a perspective projection of the each representative group image in the selected subset of representative group images; and generating the representative image to comprise at least a portion of the perspective projection for each representative group image in the selected subset of representative group image by overlapping the perspective projections for each representative group image in the selected subset of representative group image;

wherein the representative image comprises a first peripheral boundary and a second peripheral boundary opposite the first peripheral boundary;

the perspective projections for each representative group image in the selected subset of representative group images are initially overlapped so that the perspective projection of a first representative group image from the selected subset of representative group images overlaps the perspective projection of at least one additional representative group image from the selected subset of representative group images, wherein the perspective projection of the first representative group image is proximate the first peripheral boundary and the perspective projection of each additional representative group image are increasingly displaced from the perspective projection of the first representative group image in a first direction towards the second peripheral boundary; and displaying the representative image comprises progressively moving the perspective projection of each representative group image in the selected subset of representative group images in a second direction towards the first peripheral boundary, and removing the perspective projection of each representative group image in the selected subset of representative group images from the representative image when that perspective projection reaches a threshold location proximate the first peripheral boundary; and concurrently display the plurality of representative images on the display.

\* \* \* \* \*